United States Patent
Namura et al.

(10) Patent No.: US 7,959,219 B2
(45) Date of Patent: Jun. 14, 2011

(54) REINFORCEMENT STRUCTURE FOR PIPE AND CAB STRUCTURE FOR CONSTRUCTION MACHINE HAVING THE SAME

(75) Inventors: Akihide Namura, Hirakata (JP); Takahiro Noguchi, Yawata (JP); Tatsushi Itoh, Hirakata (JP); Fumiaki Kawahara, Hirakata (JP)

(73) Assignee: Komatsu Ltd., Tokyo (JP)

( * ) Notice: Subject to any disclaimer, the term of this patent is extended or adjusted under 35 U.S.C. 154(b) by 95 days.

(21) Appl. No.: 12/439,899

(22) PCT Filed: Aug. 6, 2007

(86) PCT No.: PCT/JP2007/065340
§ 371 (c)(1),
(2), (4) Date: Mar. 4, 2009

(87) PCT Pub. No.: WO2008/047505
PCT Pub. Date: Apr. 24, 2008

(65) Prior Publication Data
US 2009/0273206 A1    Nov. 5, 2009

(30) Foreign Application Priority Data

Oct. 16, 2006 (JP) .................. 2006-281118
Feb. 7, 2007 (JP) .................. 2007-028124

(51) Int. Cl.
*B60N 99/00* (2006.01)

(52) U.S. Cl. ............ 296/190.08; 296/187.03
(58) Field of Classification Search ............ 296/190.08, 296/187.01, 187.03, 187.05, 187.12, 190.01; 180/89.12
See application file for complete search history.

(56) References Cited

U.S. PATENT DOCUMENTS

| 5,756,167 | A  | * | 5/1998  | Tamura et al. ........... 296/187.03 |
| 6,092,555 | A  | * | 7/2000  | Otsuka ...................... 296/187.03 |
| 6,293,614 | B1 | * | 9/2001  | Takahara et al. ......... 296/187.05 |
| 6,409,257 | B1 | * | 6/2002  | Takashina et al. ....... 296/187.12 |
| 6,435,601 | B2 | * | 8/2002  | Takahara ................... 296/187.03 |
| 6,523,885 | B2 | * | 2/2003  | Kroning et al. .......... 296/187.03 |
| 2002/0149232 | A1 | * | 10/2002 | Sakyo et al. ............. 296/190.08 |
| 2006/0226680 | A1 | * | 10/2006 | Matsumoto et al. ..... 296/190.01 |

FOREIGN PATENT DOCUMENTS

| EP | 1 415 757 A2 | 5/2004 |
| JP | 04-044556 A | 2/1992 |
| JP | 2004-150071 A | 5/2004 |
| JP | 2005-111557 A | 4/2005 |
| JP | 2006-37360 A | 2/2006 |
| JP | 2006-240568 A | 9/2006 |

* cited by examiner

*Primary Examiner* — Lori L Lyjak
(74) *Attorney, Agent, or Firm* — Global IP Counselors

(57) ABSTRACT

A reinforcement structure for a pipe includes a hole section and a plate member. The hole section is formed on an outer peripheral surface of the pipe along a longitudinal direction of the pipe to pass through a peripheral wall of the pipe to reach an interior portion of the pipe. The plate member is inserted in the hole section and secured to the pipe.

14 Claims, 19 Drawing Sheets (a)

(b)

(c)

REINFORCEMENT STRUCTURE FOR PIPE AND CAB STRUCTURE FOR CONSTRUCTION MACHINE HAVING THE SAME

CROSS-REFERENCE TO RELATED APPLICATIONS

This U.S. national stage application claims priority to Japanese Patent Application No. 2006-281118, filed on Oct. 16, 2006 and Japanese Patent Application No. 2007-028124, filed on Feb. 7, 2007. The entire disclosures of Japanese Patent Application Nos. 2006-281118 and 2007-028124 are hereby incorporated herein by reference.

TECHNICAL FIELD

The present invention relates to a reinforcement structure for a pipe that is used as a pole member of a cab or the like installed on a construction machines such as a hydraulic excavator, and a cab structure for a construction machine that includes this reinforcement structure for a pipe.

BACKGROUND ART

In recent years, a cab structure is employed which is composed of pipe members with a cavity inside as pole members of a cab that is installed on a construction machine.

This type of cab structure that is installed on a construction machine is required to satisfy safety standards of Excavator's Operator Protection Structure (EOPS). Accordingly, pipes that are used as the pole members are also required to satisfy a predetermined value in strength. However, if the thickness of pipe is increased to improve the strength, material cost and processing cost will increase. This results in high cost. For this reason, there is a need for a reinforcement structure for a pipe that can solve problems of both strength and cost.

For example, Japanese Patent Laid-Open Publication TOKUKAI No. 2006-240568 (published on Sep. 14, 2006) discloses a structure that, in order to reinforce a pillar (pole member) that is composed of bonded sheet metal members, has a plate member that is arranged from the top end to the bottom end inside the pillar.

In addition, Japanese Patent Laid-Open Publication TOKUKAI No. 2005-111557 (published on Apr. 28, 2005) discloses a double-pipe arrangement tube production method that includes a diameter reduction process for reducing the external peripheral length of an outer pipe after an inner pipe is inserted into the outer pipe whereby forming a double-pipe arrangement tube to reinforce the pipes.

SUMMARY OF THE INVENTION

However, the aforementioned known reinforcement structures for a pipe have the following problems.

Specifically, essentially, in the reinforcement structure disclosed in Japanese Patent Laid-Open Publication TOKUKAI No. 2006-240568, in order to reinforce the total strength of a pole member that is composed of bonded sheet metal members and is inferior in strength as compared with pole members that are composed of a pipe member, the plate member is arranged inside the pole member from the top end to the bottom end of the pole member. Accordingly, the amount of the sheet metal member to compose the pole member and the plate member to be arranged inside the pole member will be increased. For this reason, this may result in high cost.

Also, in the reinforcement structure for a pipe disclosed in Japanese Patent Laid-Open Publication TOKUKAI No. 2005-111557, a large-scale device is required which forms the double-pipe arrangement part for pipe reinforcement. Accordingly, the cost for pipe reinforcement may be increased.

It is an object of the present invention to provide a reinforcement structure for a pipe that can reinforce a pipe by a simple configuration without cost increase and can provide high strength and thickness reduction of the pipe, and a cab structure for a construction machine having this reinforcement structure for a pipe.

A reinforcement structure for a pipe according to the first aspect includes a hole section and a plate member. The hole section is formed on an outer peripheral surface of the pipe along a longitudinal direction of the pipe to pass through the pipe to reach an interior portion of the pipe. The plate member is inserted in the hole section and secured to the pipe.

In this case, a reinforcement structure for a pipe is configured so that the plate member is inserted into and secured to the hole section that is formed in a predetermined position on an outer peripheral surface of a pipe along the longitudinal direction of the pipe.

In this case, the hole section that is formed on an outer peripheral surface of a pipe is preferably formed in a part that is likely to be particularly subject to a load such as in proximity to the center or at the end of the pipe in the longitudinal direction. Also, the hole section can be formed in formulation of the pipe, or can be formed by laser beam machining or the like after the pipe is formed. Also, although the hole section can be an opening that includes the hole section that passes from the outer peripheral surface to the interior of the pipe, the hole section can be a through opening that additionally includes a hole section that passes from an opposed inner peripheral surface opposed to the outer peripheral surface to an outer peripheral surface of the pipe.

Accordingly, in the case where the hole section that passes through the pipe to reach the interior of the pipe is formed on a side surface of the pipe corresponding to a part of the pipe that is required to improve in strength, and the plate member is inserted into and secured to this opening, the plate member can improve the cross-sectional strength of the pipe in the desired position. Therefore, for example, as compared with the conventional reinforcement structure that improves the strength of a pipe in a desired position by forming a double-pipe arrangement part, it is possible to improve the strength of a pipe in a desired position by a simple configuration without requirement for a large-scale device and the like. Consequently, it is possible to reduce the thickness of the pipe, and in addition to this it is possible to keep cost for reinforcement for the pipe in check and to configure the reinforcement structure for a pipe by a simple configuration.

A reinforcement structure for a pipe according to the second aspect includes a hole section and a plate member. The hole section is formed on an outer peripheral surface of the pipe to pass through the pipe to reach an interior portion of the pipe. The plate member inserted in the hole section and secured to the pipe with an insertion-side end portion of the plate member abutting against the peripheral wall of the pipe at a position opposed to the hole section.

In this case, the plate-shaped portion is inserted into the hole section that is formed in a predetermined position on the outer peripheral surface of the pipe, and is secured in the state where the insertion-side end of the plate member contacts the opposed surface of the pipe that is opposed to the formed hole section.

In this case, the hole section that is formed on the outer peripheral surface of the pipe is preferably formed in a part that is likely to be particularly subject to a load such as in proximity to the center or at the end of the pipe in the longitudinal direction. Also, the hole section can be formed in formulation of the pipe, or can be formed by laser beam machining or the like after the pipe is formed.

Accordingly, even when a bending stress is applied to the pipe, since the contact part bears the pipe, it is possible to improve pipe strength. Therefore, for example, as compared with the conventional reinforcement structure that improves the strength of a pipe in a desired position by forming a double-pipe arrangement part, it is possible to improve the strength of a pipe in a desired position by a simple structure without requirement for a large-scale device and the like. Consequently, it is possible to reduce the thickness of the pipe, and in addition to this it is possible to keep cost for reinforcement for the pipe in check and to configure the reinforcement structure for a pipe by a simple configuration.

The reinforcement structure for a pipe according to the third aspect is the reinforcement structure according to the first aspect, wherein the hole section has a first hole section formed on the outer peripheral surface of the pipe along the longitudinal direction, and a second hole section formed in the peripheral wall of the pipe at a position opposed to the first hole section. The plate member inserted in the first and second hole sections and secured to the pipe.

In this case, in the reinforcement structure for a pipe in that the plate-shaped portion is inserted into the hole section that is formed in a predetermined position on the outer peripheral surface of the pipe, and is secured to this opening, the outer peripheral surface is provided with the first hole section that will be a through-insertion-side opening for the plate member, and the second hole section that is opposed to the first hole section. The plate member is then inserted through the first hole section, and is secured in the arrangement where the end of the plate member is inserted into the second hole section.

In this case, the hole section that is formed on the outer peripheral surface of the pipe is preferably formed in a part that is likely to be particularly subject to a load such as in proximity to the center or at the end of the pipe in the longitudinal direction. Also, the first and second hole sections can be formed in formulation of the pipe, or can be formed by laser beam machining or the like after the pipe is formed. In addition, the second hole section can be a through opening that has a substantially similar length to the first hole section, or can be one or more through openings that have a length shorter than the first hole section.

Accordingly, since the plate member is inserted in the first and second openings, which are formed on the outer peripheral surfaces of the pipe opposed to each other corresponding to parts of the pipe that are required to improve in strength, the cross-sectional strength of the pipe in the desired position can be improved by this plate member. That is, since the plate member that is inserted in the first and second hole sections is secured by welding or the like in the state where the plate member is inserted in both each of the hole sections, it is possible to ensure, independent of welding strength, pipe strength in the engaged part between the plate member and the hole section that accommodate the plate-shape member. Therefore, for example, as compared with the conventional reinforcement structure that improves the strength of a pipe in a desired position by forming a double-pipe arrangement part, it is possible to improve the strength of a pipe in a desired position by a simple structure without requirement for a large-scale device and the like. Consequently, it is possible to reduce the thickness of the pipe, and in addition to this it is possible to keep cost for reinforcement for the pipe in check and to configure the reinforcement structure for a pipe by a simple configuration.

The reinforcement structure for a pipe according to the fourth aspect is the reinforcement structure according to the first aspect, wherein the plate member is inserted in the hole section and secured to the pipe with an insertion-side end portion of the plate member abutting against the peripheral wall of the pipe at a position opposed to the hole section.

In this case, the plate-shaped portion is inserted into the hole section, and is secured in the state where the insertion-side end of the plate member contacts the opposed surface of the pipe that is opposed to the formed hole section.

Accordingly, even when a bending stress is applied to the pipe, since the contact part bears the pipe, it is possible to improve pipe strength.

The reinforcement structure for a pipe according to the fifth aspect is the reinforcement structure according to the first or second aspect, further including an additional hole section is formed on the outer peripheral surface of the pipe, and an additional plate member is inserted into the additional hole section and secured to the pipe.

In this case, the reinforcement structure is configured so that the plurality of hole sections are formed on the outer peripheral surface of the pipe, and the plate member is inserted into each hole section.

Accordingly, in the case where the plate member is inserted in each of the plurality of formed hole section in a part where one plate member to be inserted and secured cannot sufficiently improve the strength of a pipe, it is possible to improve the strength of the pipe.

The reinforcement structure for a pipe according to the sixth aspect is the reinforcement structure according to the first or second aspect, wherein the plate member has a protruding portion that protrudes in a direction that intersects an insertion direction in that the plate member is inserted into the pipe. The protruding portion abuts against the outer peripheral surface of the pipe.

In this case, a protruding portion that is wider than the hole section is provided to the plate member that is inserted into the hole section that is formed on a side surface of the pipe.

Accordingly, when the plate member is inserted into the hole section, the protruding portion of the plate member contacts the outer peripheral surface of the pipe so that the plate member cannot be inserted anymore after this contact. As a result, the plate member can be positioned by a part corresponding to the protruding portion of the plate member when inserted into the pipe without using assembly jigs and the like. Note that, in this positioning, the plate member can be positioned at least one of the insertion direction of the plate member and the longitudinal direction of the pipe.

The reinforcement structure for a pipe according to the seventh aspect is the reinforcement structure according to the first or second aspect, wherein the plate member is secured to the pipe by welding.

In this case, the plate member is inserted into the hole section that is formed in a desired position of a pipe, and is secured to the pipe by welding.

Accordingly, the plate member that is inserted into the hole section through the outer peripheral surface can be easily secured from the outer peripheral surface side of the pipe.

The reinforcement structure for a pipe according to the eighth aspect is the reinforcement structure according to the third aspect, wherein the plate member has a protruding portion. The first hole section is a slot that has a length corresponding to a maximum width of the plate member. The second hole section is a slot that has a length corresponding to a width of the protruding portion of the plate member.

In this case, the protruding portion that is formed on the insertion-side end of the plate member is inserted into and secured to one or a plurality of second openings that has a length shorter than the first hole section.

Accordingly, on the second hole section side, a welding part can be short. Therefore, it is possible to improve manufacturing efficiency. Also, since the protruding portion of the end of the plate member is secured in the state where the end of the plate member is inserted in the second hole section, it is possible to ensure the strength of the pipe in the engagement part between the protruding portion and the second hole section.

The reinforcement structure for a pipe according to the ninth aspect is the reinforcement structure according to the third aspect, wherein the plate member has a plurality of protruding portions on an insertion-side end portion of the plate member.

In this case, a plurality of protruding portions are formed on the end side of the plate member that is inserted into the second hole section.

Accordingly, since a plurality of protruding portions are inserted into a plurality of second hole sections so that the plate member is secured to the pipe, the number of engagement parts between the second hole sections and the protruding portions of the plate member is increased. Therefore, it is possible to ensure sufficient pipe strength independent of welding strength.

The reinforcement structure for a pipe according to the tenth aspect is the reinforcement structure according to the third aspect, further including an additional plate member is inserted and secured to the pipe.

In this case, a plurality of first and second hole sections are formed in the pipe, and a plurality of plate members are inserted into and secured respectively to the first and second hole sections.

Accordingly, for example, it is possible to easily improve strength at a plurality of positions of a pipe such as the ends and the center of a pipe.

The reinforcement structure for a pipe according to the eleventh aspect is the reinforcement structure according to the third aspect, wherein the plate member is welded along side surfaces of a protruding portion of the plate member that sticks out from the outer peripheral surface of the pipe.

In this case, only the side surfaces of the plate member that is inserted in the first and the second hole sections of the plate member are welded so that the reinforcement plate members are secured to the pipe.

For example, if an end part of a plate member that sticks out from the second hole section side is entirely peripherally welded, a position that is likely to be subject to a stress will exist in the welded part. However, since only the side surfaces of the plate member are welded, it is possible to prevent that a weak part exists in the welded parts. Therefore, it is possible to strongly secure the plate member to the pipe.

The reinforcement structure for a pipe according to the twelfth aspect is the reinforcement structure according to the first or second aspect, wherein the hole section is formed in proximity to the center of the pipe in the longitudinal direction.

In this case, a part in proximity to the longitudinal center of the pipe can be a part of a pipe to be improved in strength.

For example, in the case where a pipe is used as a pole member of a cab of a construction machine, since a part in proximity to the center of the pipe is likely to be subject to a load. Therefore, in this case, it is possible to improve the strength of this part in proximity to the center of the pipe.

The reinforcement structure for a pipe according to the thirteenth aspect is the reinforcement structure according to the first or second aspect, wherein the hole section is formed to an end part of the pipe in the longitudinal direction.

In this case, a part in proximity to the end in the longitudinal direction of the pipe can be a part of a pipe to be improved in strength.

Accordingly, for example, in the case where a pipe is used as a pole member of a cab of a construction machine, a connection part between pipes or between a pipe and a floor plate member can be improved in strength which is likely to be subject to a load.

The reinforcement structure for a pipe according to the fourteenth aspect is the reinforcement structure according to the ninth aspect, wherein the protruding portions are spaced at different intervals away from each other.

In this case, the plurality of protruding portions are unequally spaced away from each other which are formed on the insertion-side end surface of the plate member that is inserted into the second hole section formed in the pipe.

Accordingly, the protruding portions of the plate member can be arranged suitably at required positions such as according to strength-required positions, and therefore it is possible to more effectively improve the strength of a pipe.

The reinforcement structure for a pipe according to the fifteenth aspect is the reinforcement structure according to the ninth aspect, wherein the protruding portions have different lengths.

In this case, the plurality of protruding portions have different lengths which are formed on the insertion-side end surface of the plate member that is inserted into the second hole section formed in the pipe.

Accordingly, the protruding portions can be arranged which suitably have required lengths according to strength-required positions and the like, and therefore it is possible to more effectively improve the strength of a pipe.

A cab structure for a construction machine according to the sixteenth aspect includes a plurality of pole members that have the reinforcement structure for a pipe according to the first or second aspect.

In this case, the aforementioned reinforcement structure for a pipe is adopted to a plurality of pole members that compose a cab of a construction machine.

Accordingly, the reinforcement structure for a pipe can be adopted to desired parts in that strength are required as a cab, and therefore it is possible to improve the rigidity of the cab at low cost.

The cab structure for a construction machine according to the seventeenth aspect is the cab structure according to the sixteenth aspect, further including a cover member that covers a part of the pipe where the plate member is inserted in the hole section.

In this case, in the configuration where pipes that have the aforementioned reinforcement structure for a pipe are used as pole members of a cab, cover members such as exterior wall panels cover the reinforced parts where the plate members are inserted in the hole sections of the pipes.

The reinforced parts can be invisible in which the plate member is inserted and secured. Consequently, it is possible to prevent marring the appearance of a cab structure, and additionally to provide a highly strong cab structure.

BEST MODE FOR CARRYING OUT THE INVENTION

First Embodiment

With reference to FIG. 1 to FIG. 5(b), the following description will describe a hydraulic excavator 1 that includes a cab 10 to which a reinforcement structure for a pipe according to one embodiment of the present invention is adopted.

Figure 1:
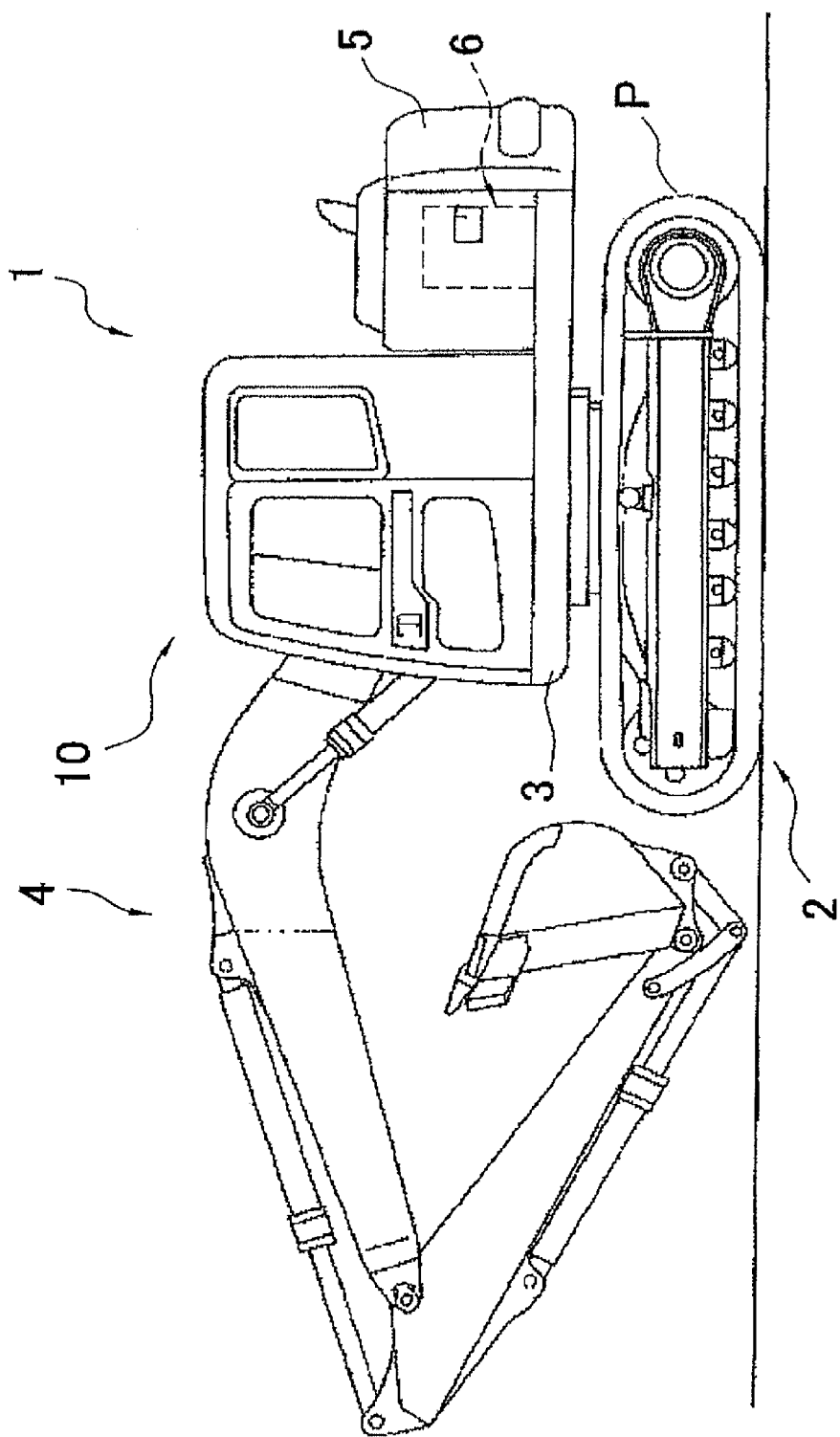
FIG. 1 is a perspective view showing the configuration of a hydraulic excavator on which a cab is installed, the cab including pole members to which a reinforcement structure for a pipe according to one embodiment of the present invention is adopted.

As used herein to describe the present invention, terms "left and right", "front and rear", and "front-side surface and rear-side surface" should be interpreted as directions relative to an operator when sitting on a seat in the cab 10 (see FIG. 1, for example).

Overall Configuration of Hydraulic Excavator 1

The hydraulic excavator 1 according to this embodiment includes a lower traveling unit 2, a revolving base 3, a working unit 4, a counterweight 5, an engine 6, and the cab 10, as shown in FIG. 1.

The lower traveling unit 2 drives endless belts P that are wounded on the left and right sides of the lower tractor portion 2 relative to the advance direction so that the hydraulic tractor shovel 1 moves frontward and rearward. The revolving base 3 is revolvably mounted on the upper side of the lower traveling unit 2.

The revolving base 3 can revolve in either direction on the lower traveling unit 2. The working unit 4, the counterweight 5, the engine 6, and the cab 10 are mounted on the upper side of the revolving base 3.

The working unit 4 includes a boom, an arm that is mounted to the fore end of the boom, and a bucket that is mounted to the fore end of the arm. The working unit 4 moves the arm, the bucket, and the like upward and downward by means of hydraulic cylinders to excavate earth and stones in the field of civil engineering works.

The counterweight 5 is composed of scrap iron, concrete and the like that are fixed in a box that is composed of steel plates, for example, and is arranged on the rear of the revolving base 3 to keep the balance of a machine body in an excavation work or the like.

The engine 6 is a driving source that powers the lower traveling unit 2 and the working unit 4, and is arranged in proximity to the counterweight 5.

The cab 10 is an operator compartment of the hydraulic excavator 1 where the operator steps into/off, and is arranged on the front left side of the revolving base 3 at the side of the working unit 4 to provide a clear sight line to the fore end of the working unit 4 for the operator. The cab configuration of the cab 10 will be described below.

Configuration of Cab 10

Figure 2:
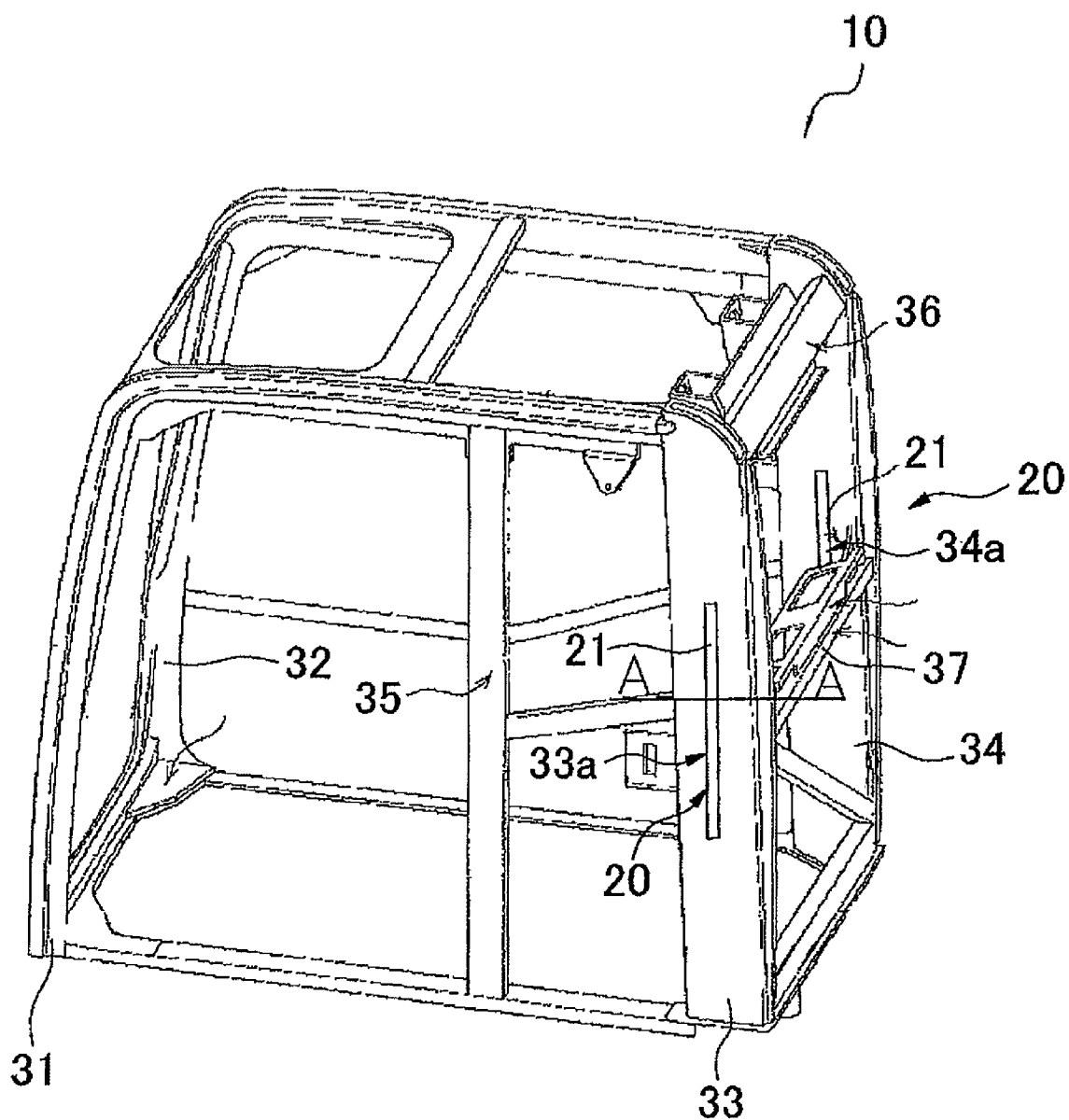
FIG. 2 is a perspective view showing the configuration of the cab that is installed on the hydraulic excavator shown in FIG. 1.

As shown in FIG. 2, EOPS is adopted to the cab 10, and the cab 10 is a box-shaped structure where the operator steps into/off. The cab 10 is composed of five of, various types of pole members 31 to 35, and the like.

A front left pole member 31, a front right pole member 32, a rear left pole member 33, a rear right pole member 34, and a left central pole member 35 are included as the pole members 31 to 35.

The front left pole member 31 and the front right pole member 32 are used as so-called "A pillar" poles, and have a hollow interior with cross-sectionally odd shape. The front left and right pole members 31 and 32 are bent in proximity to the center, and include pole portions and beam portions. The pole portions stand in the front of the cab 10 on the floor surface. The beam portions compose a roof surface.

Figure 3:
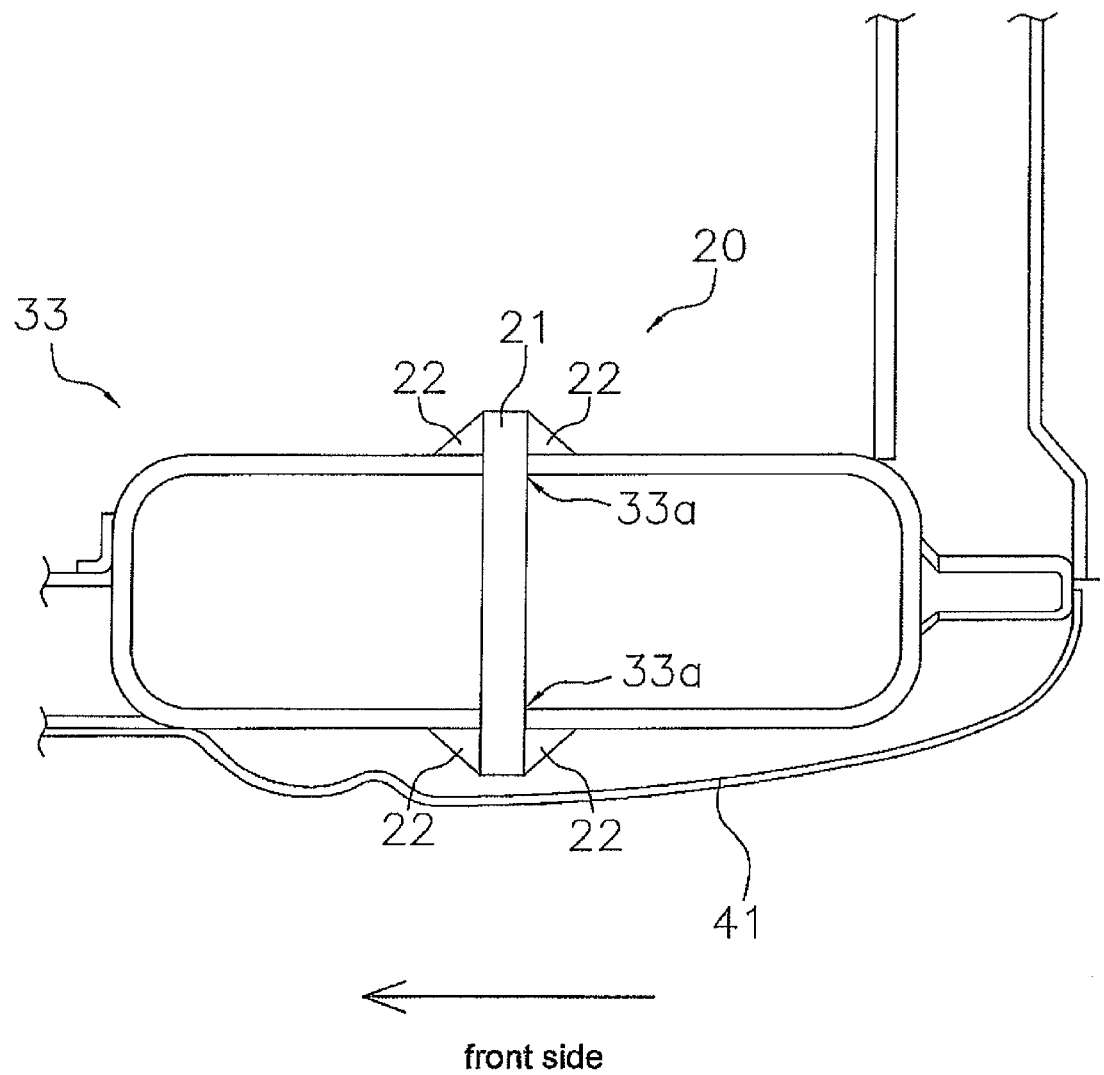
FIG. 3 is a cross-sectional view showing the configuration of, among pole members that compose the cab shown in FIG. 2, a pole member to which the reinforcement structure is adopted taken along the line A-A of FIG. 2.

The rear left pole member 33 and the rear right pole member 34 are used as so-called "C pillar" poles, and have a hollow interior with a cross-sectionally substantially rectangular, odd shape (refer to FIG. 3). The rear left and right pole members 33 and 34 stand on the floor surface as substantially straight poles in the rear of the cab 10. As shown in FIG. 2, the top ends of the rear left and right pole members 33 and 34 are connected to each other by a beam member 36, and central parts of the rear left and right pole members 33 and 34 are connected to each other by a rear-side surface plate 37. The rear left pole member 33 and the rear right pole member 34 play an important role that ensures the strength of the cab 10. For this reason, in order to improve the strength of the cab 10, it is effective to improve the strength of the rear left and right pole members 33 and 34. Accordingly, in this embodiment, as shown in FIG. 2, hole sections 33a and 34a are formed on the side surfaces of the rear left and right pole members 33 and 34, respectively, and plate members 21 are inserted into and secured to the hole sections 33a and 34a so that a reinforcement structure 20 is adopted to the rear left and right pole members 33 and 34. The configuration of the reinforcement structure 20 will be described later.

The left central pole member 35 is used as a so-called "B pillar" pole, and stands as a substantially straight pole in a substantially center part in the left side surface of the cab 10 on the floor.

Reinforcement Structure 20 of Rear Left and Right Pole Members 33 and 34

In this embodiment, as shown in FIG. 2, the reinforcement structure 20 is adopted to, among the aforementioned pole members 31 to 35 that compose the cab 10 that is installed on the hydraulic excavator 1, the pole members 33 and 34 corresponding to C pillars that are arranged in the rear of the cab 10. The configuration of the rear left pole member 33 will be illustratively described. The reinforcement structure 20 is similarly adopted to the other, rear right pole member 34. Accordingly, the description of the reinforcement structure on the rear right pole member 34 side is omitted.

As shown in FIG. 2, the hole section 33a is formed in proximity to the longitudinal center of the side surface of the rear left pole member 33. As shown in FIG. 3, the plate member 21 with a size corresponding to the size of the hole section 33a is inserted into the hole section 33a to straddle opening parts that are formed on the both side surfaces of the pole member 33, and is then secured. Thus, the reinforcement structure 20 is configured.

In the cab 10 according to this embodiment, as shown in FIG. 3, an outer wall panel (cover member) 41 covers the outer peripheral surface of a part in that the aforementioned reinforcement structure 20 is formed so that the part is invisible. Accordingly, it is possible to prevent that the plate member 21, welding parts 22 and the like that are included in the reinforcement structure 20 are exposed externally of the cab 10. Therefore, it is possible to prevent impairing the design of the cab 10.

The following description describes a manufacturing method of the reinforcement structure 20 of the rear left pole member 33 with reference to FIG. 4(a) to FIG. 4(c), and FIG. 5(a) and FIG. 5(b).

First, as shown in FIG. 4(a), the hole section 33a is formed by a three-dimensional laser to pass through from one side surface to the other side surface in the cross-sectionally substantially rectangular shape of the rear left pole member 33.

Subsequently, as shown in FIG. 4(b) and FIG. 5(a), the plate member 21 has a size that can be inserted into the hole section 33a parts, and is inserted to straddle the opening parts that are formed on the both side surfaces of the hole section 33a. In this case, the plate member 21 to be inserted into the hole section 33a has protruding portions 21a that protrude in a direction that intersects a plate member 21 insertion direction, as shown in FIG. 5(a). Accordingly, when the plate member 21 is inserted into the hole section 33a that is formed on a side surface of the rear left pole member 33, the protruding portion 21a contacts the side surface of the rear left pole member 33. Thus, the plate member 21a cannot be inserted anymore after this contact. Therefore, it is possible to easily position the plate member 21 in the insertion direction relative to the hole section 33a.

Subsequently, the welding parts 22 are formed on the rear left pole member 33 in the state shown in FIG. 4(b) and FIG. 5(b) from the exterior sides of the both side surfaces by a welding robot or the like. Thus, the plate member 21 can be easily and firmly secured to the rear left pole member 33.

In this embodiment, the reinforcement structure 20 in that the plate member 21 is inserted into and secured to the hole sections 33a and 34a is adopted to the rear left and right pole members 33 and 34 that are arranged in the rear of the cab 10 among a plurality of pole members 31 to 35 that compose the cab 10.

Accordingly, it is possible to improve cross-sectional strength at desired positions in the rear left and right pole members 33 and 34. Consequently, the strength of the pole members are improved in a relatively easy and low manufacturing-cost manner to improve the rigidity of the cab 10.

Features of Reinforcement Structure 20 of Rear Left and Right Pole Members 33 and 34

(1) In the reinforcement structure 20 of the rear left and right pole members 33 and 34 according to this embodiment, as shown in FIG. 2 and FIG. 3, the hole sections 33a and 34a are formed in predetermined positions of the outer peripheral surfaces in the rear left and right pole members 33 and 34, and the plate member 21 is inserted into and secured to the hole sections 33a and 34a.

Accordingly, the strength of parts of the rear left and right pole members 33 and 34 can be locally improved which are likely to be subject to a load in a relatively easy manner. As a result, as compared to a reinforcement structure which forms a double-pipe arrangement part, it is possible to easily improve the strength of the rear left and right pole members 33 and 34 without requirement for a large-scale device.

Also, in the case where the pipe thickness of the rear left and right pole members 33 and 34 is reduced, this reinforcement structure 20 can reduce the cost of the cab 10. The reason is that this reinforcement structure 20 can ensure strength as well as or better than the reinforcement structure that forms a double-pipe arrangement part.

(2) In the reinforcement structure 20 of the rear left and right pole members 33 and 34 according to this embodiment, as shown in FIG. 2, the reinforcement structure 20 that includes the hole sections 33a and 34a and the plate member 21 is formed in proximity to the longitudinal center of the rear left and right pole members 33 and 34.

Accordingly, even in the case where a load is likely to intensively applied to a part in proximity to the longitudinal center of the rear left and right pole members 33 and 34, such as in the case of the cab 10 of the hydraulic excavator 1, it is possible to locally improve the cross-sectional strength of the part. Consequently, it is possible to improve the rigidity of the cab 10 without a large increase in cost.

Figure 4:
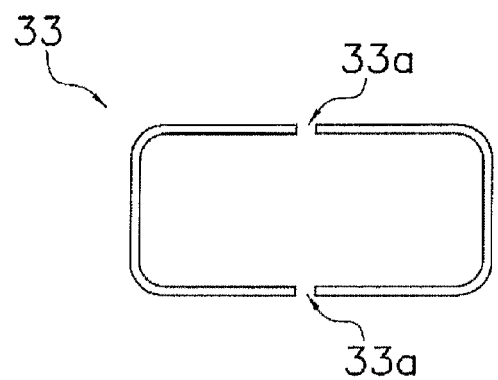
FIG. 4 includes cross-sectional views (a) to (c) showing processes in that the pole member to which the reinforcement structure shown in FIG. 2 is adopted is constructed.
Figure 4:
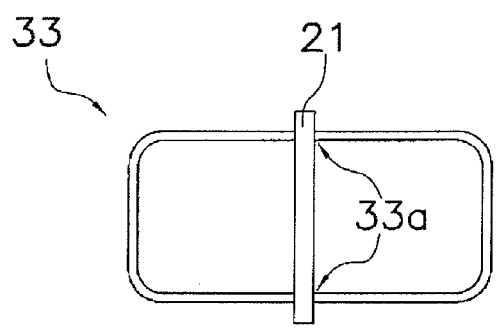
Figure 4:
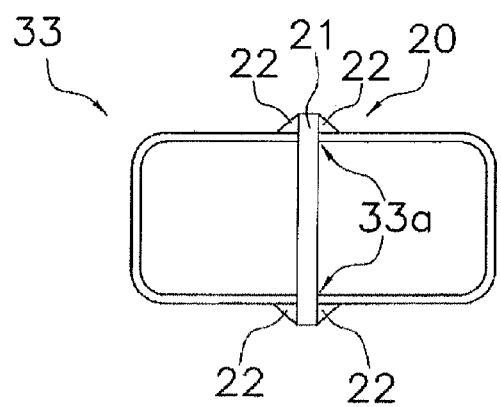
Figure 5:
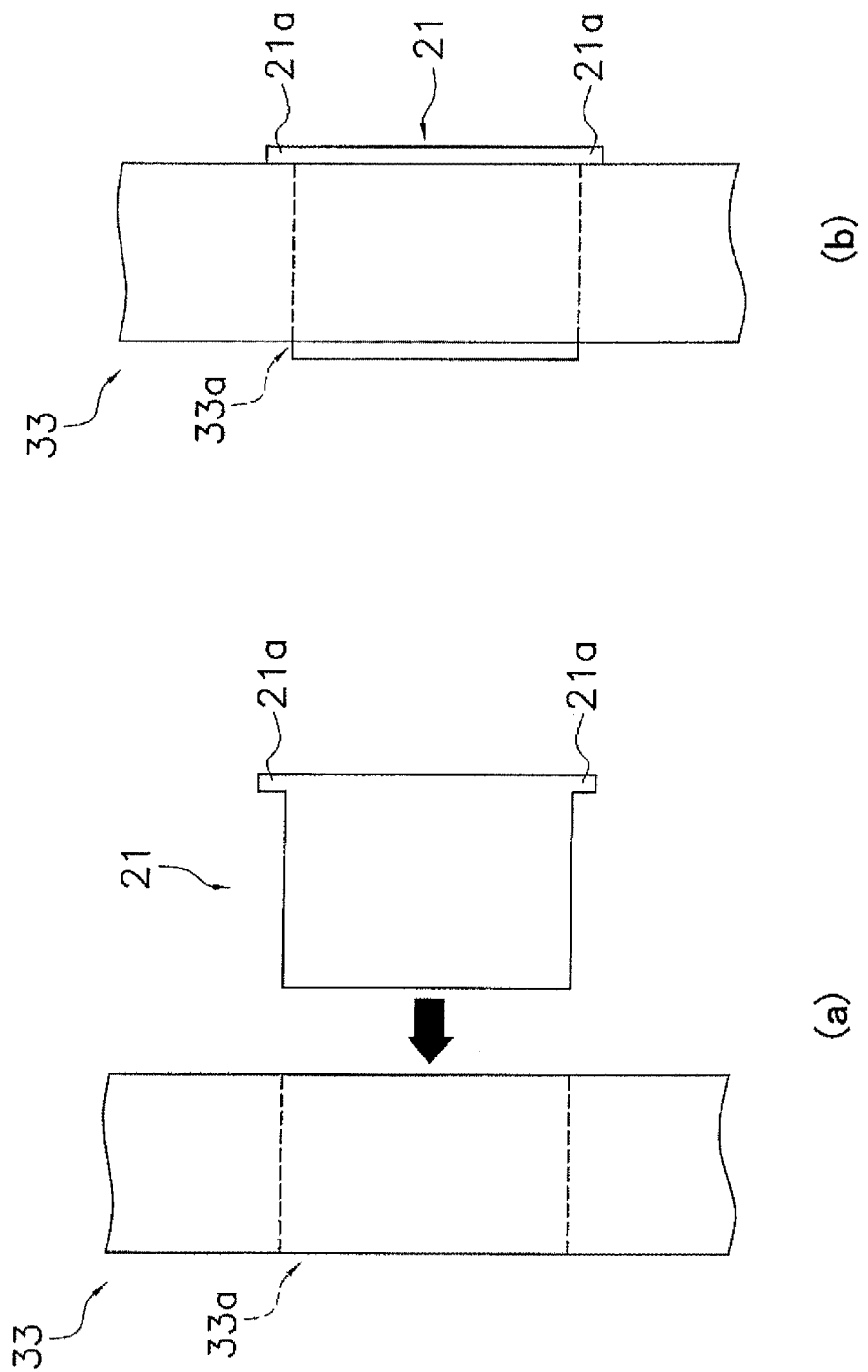
FIG. 5 includes front views (a) and (b) showing processes in that the pole member to which the reinforcement structure shown in FIG. 2 is adopted is constructed.

(3) In the reinforcement structure 20 of the rear left and right pole members 33 and 34 according to this embodiment, as shown in FIG. 4(*a*) and FIG. 4(*b*), the plate member 21 that is inserted in the hole sections 33*a* that are formed on the side surfaces of the rear left pole member 33 has the protruding portions 21*a* that protrude in the directions that intersect the insertion direction.

Accordingly, the position in the insertion direction of the plate member 21 to be secured can be easily positioned without using assembly jigs and the like, and the plate member 21 can be secured by welding or the like.

(4) In the reinforcement structure 20 of the rear left and right pole members 33 and 34 according to this embodiment, as shown in FIG. 4(*c*), the plate member 21 that is inserted in the hole sections 33*a* that are formed in the side surfaces of the rear left pole member 33 is secured by forming the welding parts 22 from the outer peripheral surface side of the rear left and right pole members 33 and 34.

Accordingly, the plate members 21 made of metal can be easily secured to the rear left and right pole members 33 and 34 made of metal.

(5) As shown in FIG. 2 or the like, the cab 10 of the hydraulic excavator 1 according to this embodiment includes a plurality of pole members 31 to 35 that include the rear left and right pole members 33 and 34 to which the aforementioned reinforcement structure 20 is adopted.

Accordingly, it is possible to locally improve a part that is likely to be intensively subject to a load in a particular pole member that requires strength without a large increase in cost by a simple facility, and thus to improve the rigidity of the entire cab 10.

(6) In the cab 10 of the hydraulic excavator 1 according to this embodiment, as shown in FIG. 3, the outer wall panel 41 covers the parts of the rear left and right pole members 33 and 34 to which the aforementioned reinforcement structure 20 is adopted.

Accordingly, it is possible to prevent that the parts corresponding to the hole sections 33*a* and 34*a*, the plate member 21 and the welding portion 22 are externally exposed that are included in the reinforcement structure 20. Therefore, it is possible to avoid impairing the appearance design of the cab 10.

Second Embodiment

With reference to FIG. 11 to FIG. 17, the following description will describe a reinforcement structure for a pipe 120 according to another embodiment of the present invention.

Note that, in description of this embodiment, components that have shapes and functions similar to the components described in the foregoing embodiment are attached with the same reference numerals and their description is omitted.

Figure 11:
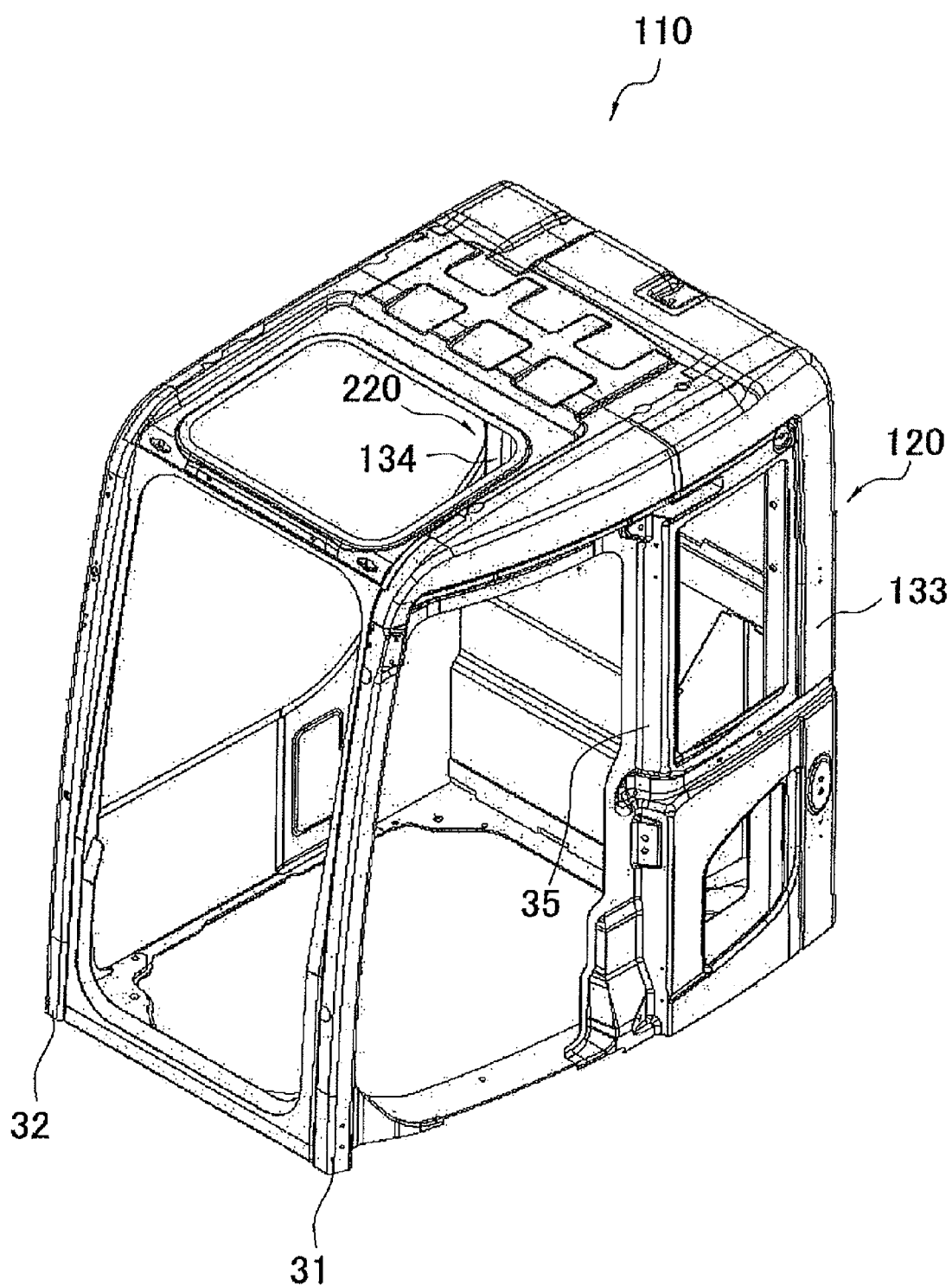
FIG. 11 is a perspective view showing the configuration of a cab to which a reinforcement structure for a pipe according to another embodiment of the present invention is adopted.

That is, as shown in FIG. 11, among a plurality of pole members 31, 32, 133, 134 and 35 that compose a cab 110, the reinforcement structure 120 according to this embodiment is provided for the rear left and right pole member 133 and 134.

Figure 12:
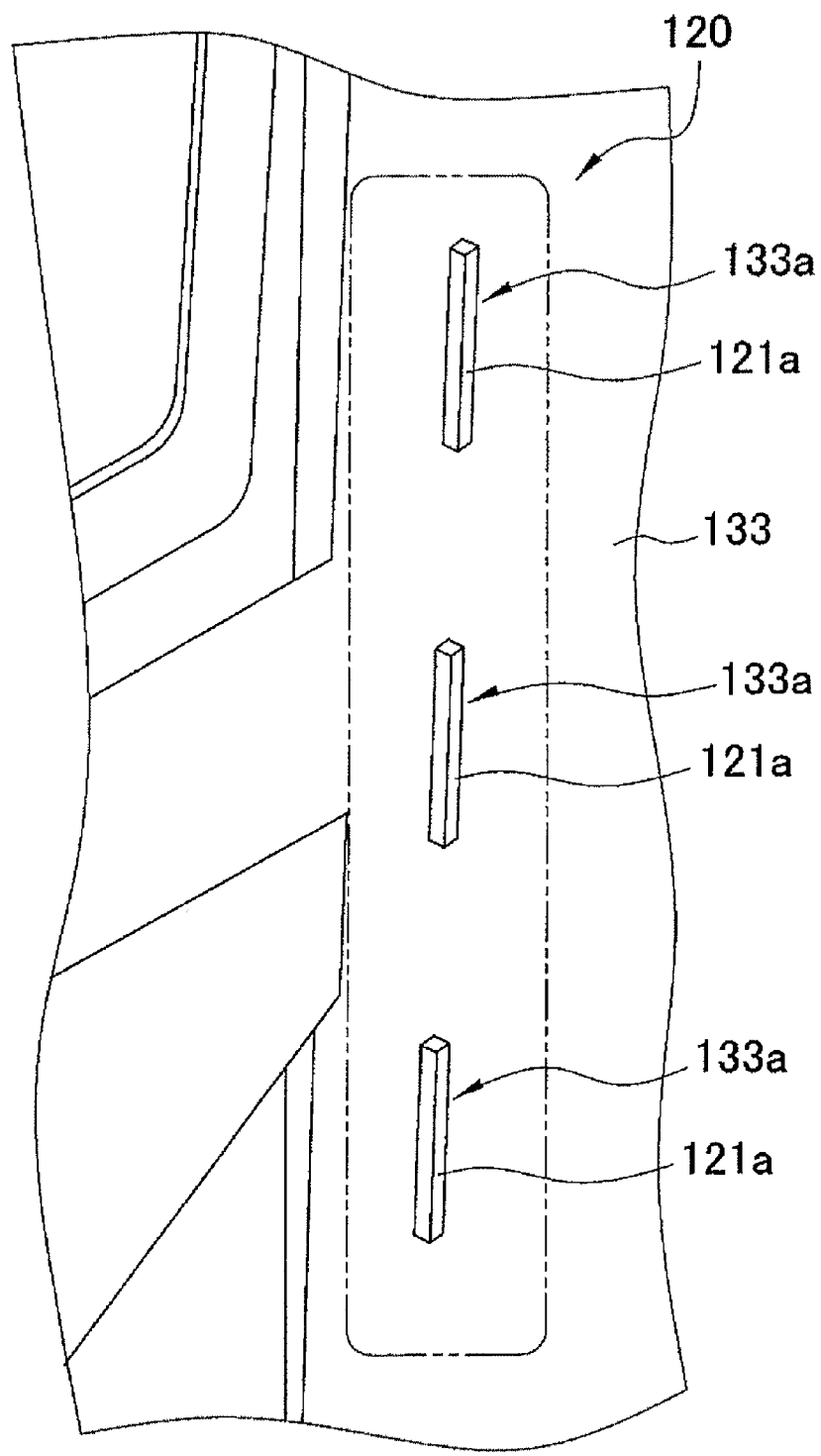
FIG. 12 is an enlarged view showing the reinforcement structure that is adopted to a pole member that composes the cab shown in FIG. 11.

Specifically, as shown in FIG. 12, in the reinforcement structure 120 that is provided for the rear left pole member (pole member) 133, a plate member 121 is secured to the rear left pole member 133 in the state where protruding portions 121*a* that are formed on the insertion-side end surface of the plate member 121 (see FIG. 16) stick out from a plurality of hole sections (second hole section) 133*a* that are formed on one surface of the rear left pole member 133.

Figure 13:
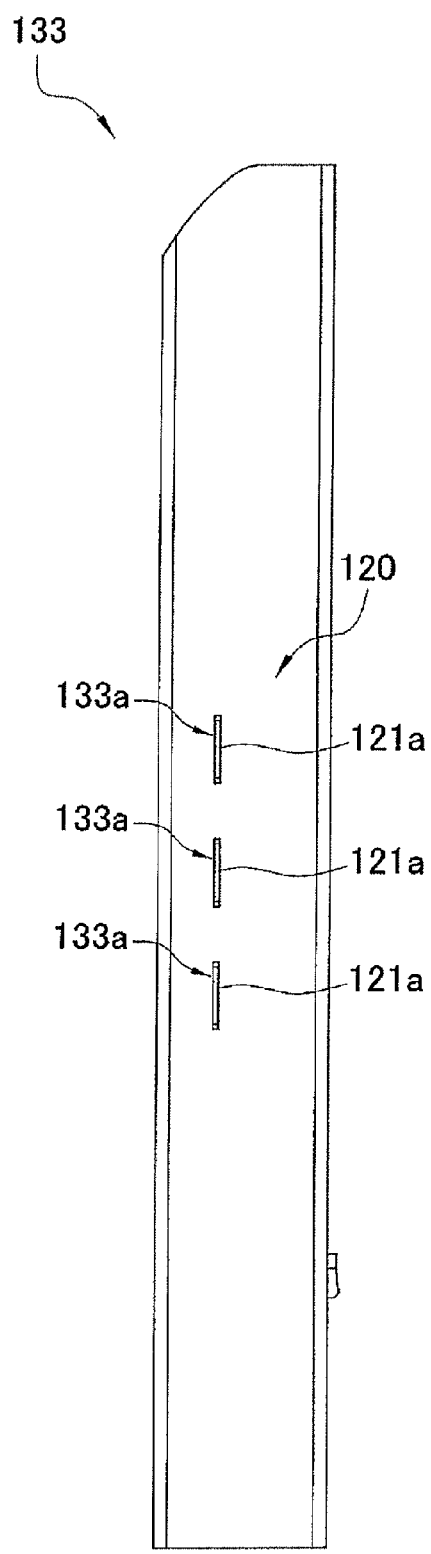
FIG. 13 is a side view of the pole member shown in FIG. 12 on a plate member non-through-insertion side.
Figure 14:
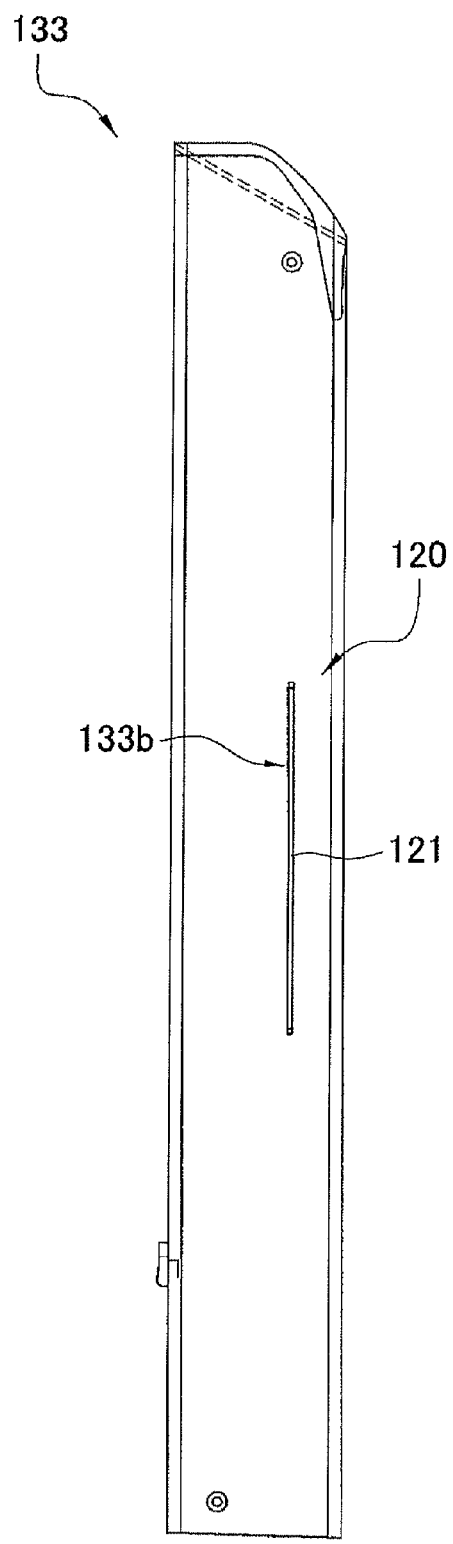
FIG. 14 is a side view of the pole member shown in FIG. 12 on a plate member through-insertion side.
Figure 15:
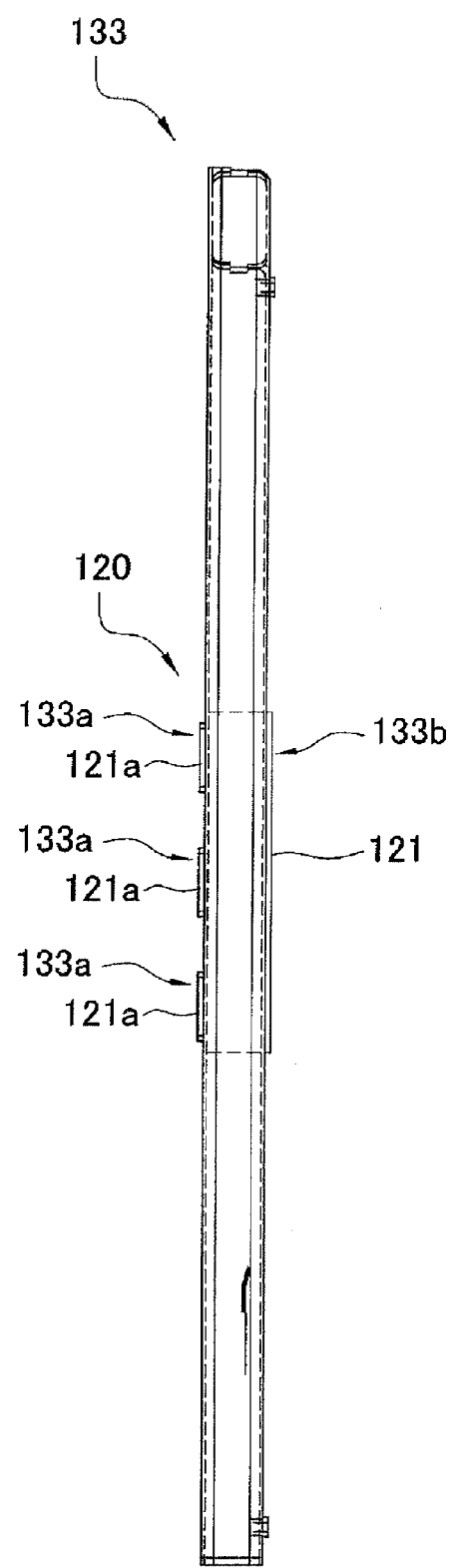
FIG. 15 is a front view of the pole member shown in FIG. 12.

As shown in FIG. 13, the hole sections 133*a* that are formed in the rear left pole member 133 have the same size, and are arranged at three positions in proximity to the center of the rear left pole member 133 to be spaced at the same interval away from each other. Also, as shown in FIG. 14, a hole section (first hole section) 133*b* that is to accommodate the plate member 121 is formed on a side surface that is opposed to the other side surface of the rear left pole member 133. The plate member 121 is inserted through the hole section 133*b* in the state where the protruding portions 121*a* serves as the insertion side. Accordingly, the hole section 133*b* in the rear left pole member 133 has a length slightly larger than the overall width of the plate member 121 to be inserted. The plate member 121 that is inserted through the hole section 133*b* of the rear left pole member 133 reaches the hole sections 133*a* that are formed on the other surface from the one side surface of the pipe, and as shown in FIG. 15 the protruding portions 121*a* that are formed on the end surface of the plate member 121 are inserted into the corresponding hole sections 133*a*. Thus, the plate member 121 is secured by welding.

Figure 16:
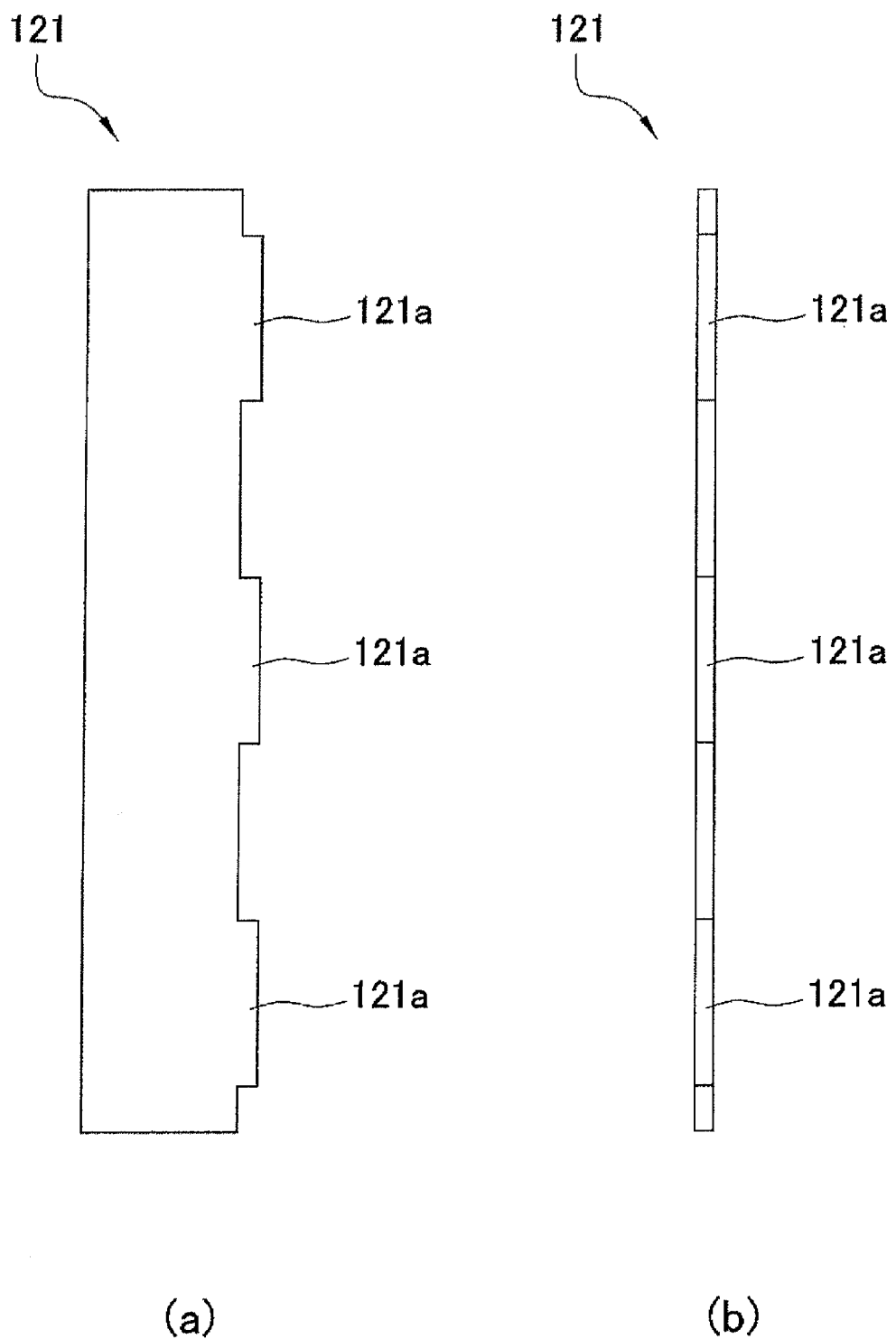
FIG. 16 includes a side view (a) and a front view (b) showing the configuration of the plate member to be inserted in the pole member shown FIG. 12.

The plate member 121 that is inserted into the hole sections 133*a* through the hole section 133*b* that are formed on the outer peripheral surfaces of the rear left pole member 133 has three protruding portions 121*a* that have substantially the same size and are arranged on the insertion-side end surface of the plate member 121 to be spaced at the same interval away from each other as shown in FIG. 16(*a*) and FIG. 16(*b*). In the state where the protruding portions 121*a* that are formed on the end surface of the plate member 121 stick out from the hole sections 133*a*, the plate member 121 is secured by welding the plate member 121 along side surface parts of the protruding portions 121*a*, and side surface parts of the plate member 121 that stick out from the hole section 133*b* on the through-insertion side that is opposed to the hole sections 133*a*.

Thus, the plate member 121 that is inserted through the one side surface of the rear left pole member 133 is secured by welding in the state where the protruding portions 121*a* are inserted in the hole sections 133*a* that are formed on the opposed side surface. Since engagement parts between the protruding portions 121*a* and the hole sections 133*a* bear the rear left pole member 133, it is possible to improve the strength of the rear left pole member 133. Accordingly, since the engagement between the protruding portions 121*a* and the hole sections 133*a* is provided as a mechanical reinforcement structure, even when a bending stress is applied to the rear left pole member 133, the engagement parts bear the rear left pole member 133. Therefore, it is possible to ensure sufficient strength of the rear left pole member 133 independent of welding strength. Also, since the plate member 121 that composes the reinforcement structure 120 is secured by welding parts corresponding to the protruding portion 121*a*, the area to be welded can be reduced on the non-through-insertion side. Therefore, it is possible to improve manufacturing efficiency. Also, since welding of the plate member 121 on the through-insertion side and the non-through-insertion side is conducted only on the side surfaces of plate member 121, as compared with the case where welding is conducted all around, it is possible to avoid occurrence of problems such as occurrence of cracks in the welding part.

Figure 17:
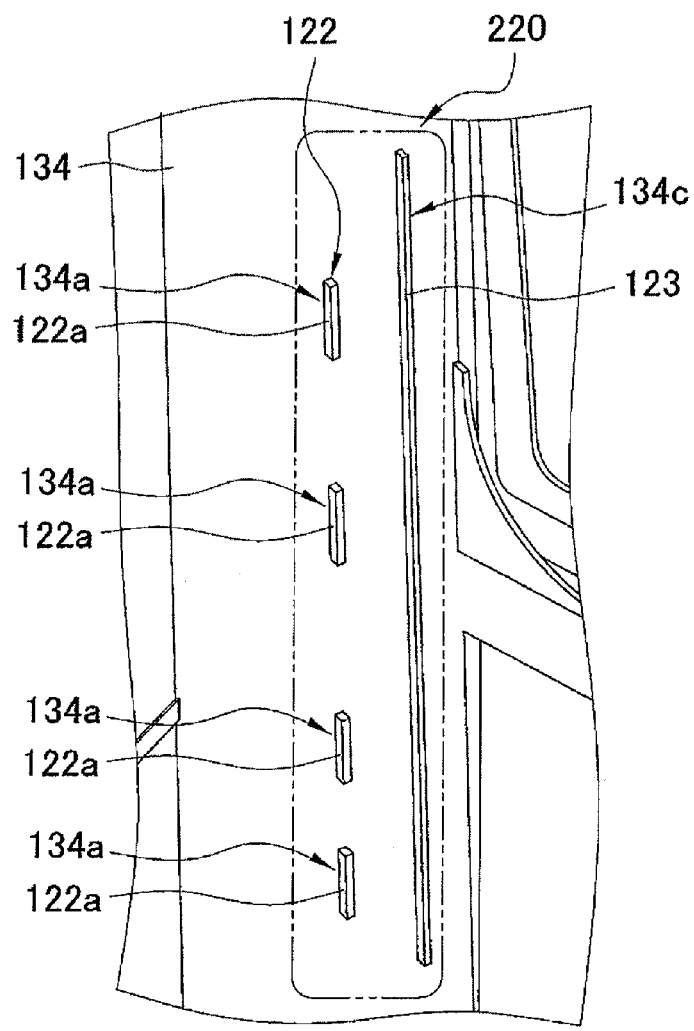
FIG. 17 is an enlarged view showing the reinforcement structure that is adopted to a pole member that composes the cab shown in FIG. 11.

In addition, as shown in FIG. 17, a reinforcement structure 220 is adopted to the rear right pole member 134 similarly to the rear left pole member 133.

In the reinforcement structure 220 of the rear right pole member 134, as shown in FIG. 17, two plate members 122 and 123 are inserted in the rear right pole member 134 in the opposite directions. More specifically, a hole section (first hole section) 134c that accommodates the plate member 123, and hole sections (second hole section) 134a that accommodate protruding portions 122a of the plate member 122 are formed substantially at the same height positions on one side surface of the rear right pole member 134. The plate members 122 and 123 are inserted through the respective hole sections 134a and 134c from the side surfaces opposed to each other.

Accordingly, similar to the rear left pole member 133, the strength of the rear right pole member 134 can be effectively improved by the simple structure. Also, as shown in FIG. 17, since two plate members 122 and 123 are inserted, it is possible to more effectively improve the strength of the rear right pole member 134. Also, since the two plate members 122 and 123 are inserted in the opposite directions and are secured, engagement parts between the protruding portions 122a and the like, and the hole sections 134a can be arranged on the both side surfaces of the rear right pole member 134. Consequently, it is possible to provide the rear right pole member 134 with excellent strength.

Features of Reinforcement Structures 120 and 220 of Rear Left and Right Pole Members 133 and 134

(1) As shown in FIG. 15, the reinforcement structures 120 and 220 of the rear left and right pole members 133 and 134 according to this embodiment include the hole section 133b of through opening that is formed on one side surface of the rear left pole member 133, the hole sections 133a of through openings that are formed on a surface opposed to the one side surface, and the plate member 121 that is secured in the state where the plate member 121 is inserted through the hole section 133b into the hole sections 133a.

Accordingly, since, on the surface opposed to the hole section 133b through which the plate member 121 inserted, the hole sections 133a that accommodate the end parts of the plate member 121 are also arranged, when a bending stress is applied to the rear left pole member 133, the engagement parts between the protruding portions 121a of the plate member 121 on the through-insertion side and the hole sections 133a provide a resistance force to prevent bending of the rear left pole member 133. As a result, it is possible to ensure strength of the rear left pole member 133 independent of welding strength that connects the plate member 121 and the rear left pole member 133. Also, since the protruding portions 121a and the like are arranged on the insertion-side end surface of the plate member 121 and the like, the area to be welded can be greatly reduced on the protruding portions 121a side. Therefore, it is possible to improve manufacturing efficiency.

(2) In the reinforcement structure 120 and 220 of the rear left and right pole members 133 and 134 according to this embodiment, as shown in FIG. 15 or the like, the hole section 133b that is formed on one side surface of the rear left pole member 133 has a length corresponding to the overall width of the plate member 121, and the hole sections 133a that are formed on the other side surface have a length corresponding to the width of the protruding portions 121a of the plate member 121.

Accordingly, since the protruding portions 121a of the end parts of the plate member 121 that are inserted through the through-insertion side hole section 133b are inserted into and secured to the hole sections 133a that are formed on the surface opposed to the hole section 133b, the engagement parts between the protruding portions 121a and the hole sections 133a can reinforce the rear left pole member 133.

(3) In the reinforcement structures 120 and 220 of the rear left and right pole members 133 and 134 according to this embodiment, as shown in FIG. 16 or the like, each of the plate members 121 to 123 that are inserted in the corresponding pole members 133 and 134 has a plurality of protruding portions 121a, 122a or the like.

Accordingly, since the number of engagement parts of the hole sections 133a or 134a in the rear left or right pole member 133 or 134 is increased, it is possible to effectively improve strength of parts of the rear left or right pole member 133 or 134 where the plate members 121 to 123 is inserted.

(4) In the reinforcement structure 220 of the rear right pole member 134 according to this embodiment, as shown in FIG. 17, the two plate members 122 and 123 are inserted in one pole member.

Accordingly, the two plate members 122 and 123 can greatly improve pipe sectional strength, it is possible to further improve strength of a part of the rear right pole member 134 where the plate members 122 and 123 are inserted.

(5) In the reinforcement structures 120 and 220 of the rear left and right pole members 133 and 134 according to this embodiment, as shown in FIG. 12, FIG. 17 or the like, in the protruding portions 121a, 122a and the like of the plate members 121 and 122 and 123 that stick out from the hole sections 133a and 134a of the rear left pole member 133, welding is conducted along the side surface parts of the protruding portion 121a and the like.

Accordingly, it is possible to effectively prevent that cracks appear in welding parts in the case where welding is conducted in the externally-exposed protruding portion 121a all around, and additionally to connect the plate member 121 or the like to the rear left pole member 133 or the like by welding.

Other Embodiments

The foregoing description has described exemplary embodiments according to the present invention. However, the present invention is not limited to the foregoing embodiments. Various changes and modifications can be made without departing from the spirit of the present invention.

(A) In the foregoing first embodiment, as shown in FIG. 2, it has been illustratively described that the hole sections 33a and 34a are formed in a part in proximity to the center in the width direction of the side surfaces of the rear left and right pole members 33 and 34, and that the reinforcement structure 20 is configured so that the plate members 21 are inserted into the hole sections 33a and 34a. However, the present invention is not limited to this.

Figure 6:
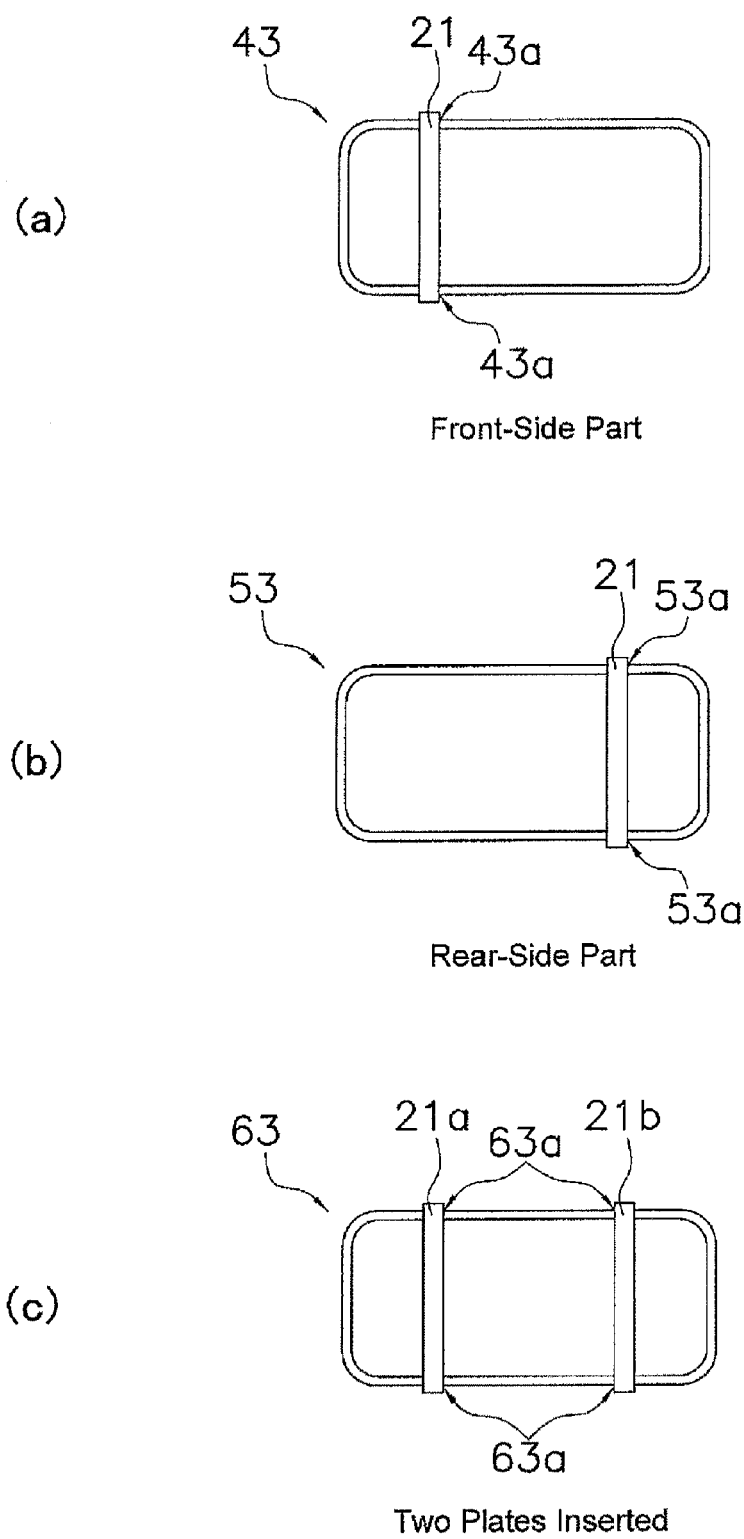
FIG. 6 includes cross-sectional views (a) to (c) showing the configuration of a pipe to which a reinforcement structure for a pipe according to another embodiment of the present invention is adopted.

For example, a hole section 43a may be formed not in a part in proximity to the center in the width direction of the pole member but in a front-side part of the cab in plan view as shown in FIG. 6(a), and a pole member 43 may be used in that the plate member 21 is inserted into and secured to the hole section 43a.

Also, a hole section 53a may be formed in a rear-side part relative to the cab in plan view as shown in FIG. 6(b), and a pole member 53 may be used in that the plate member 21 is inserted into and secured to the hole section 53a.

In the case where a part in that the plate member is inserted is thus changed according to the magnitude and the direction of a load that is applied to a pole, it is possible to effectively improve the partial cross-sectional strength of the pole member.

(B) In the foregoing first embodiment, as shown in FIG. 3, it has been illustratively described that one plate member 21 is inserted in one hole sections 33a or 34a that is formed in one pole member 33 or 34. However, the present invention is not limited to this.

For example, as shown in FIG. 6(c), the reinforcement structure for a pipe may be configured so that two hole sections 63a are formed in one pole member 63, and plate members 21a and 21b are inserted in the two hole sections 63a.

In this case, since the cross-sectional strength of the pole member can be further improved, this configuration is effective to improve the partial strength of a part that requires strength.

(C) In the foregoing first embodiment, as shown in FIG. 2, it has been illustratively described that the hole sections 33a and 34a are formed in a part in proximity to the longitudinal center of the rear left and right pole members 33 and 34, and that the plate members 21 are inserted into and secured to the hole sections 33a and 34a. However, the present invention is not limited to this.

Figure 7:
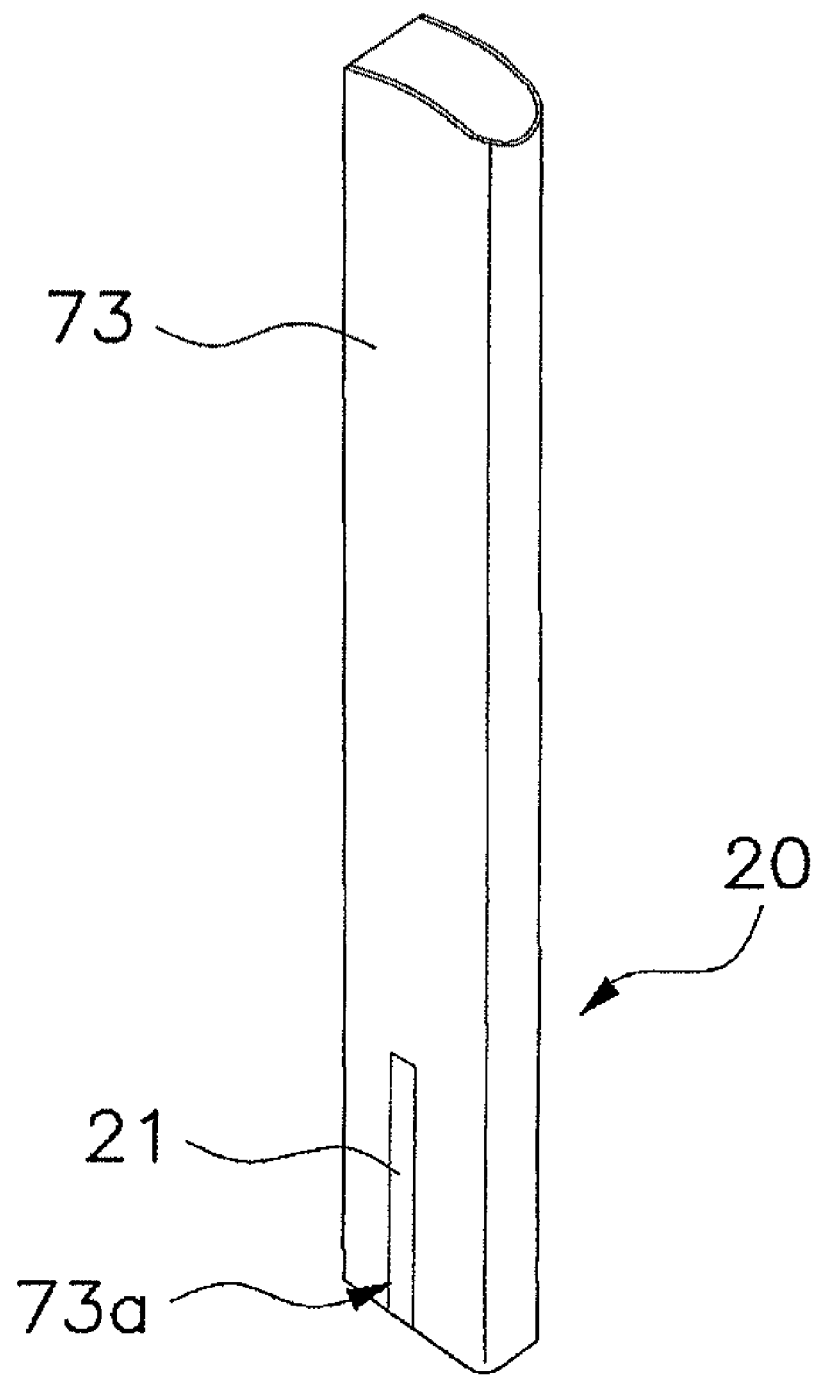
FIG. 7 includes a perspective view showing the configuration of a pipe that is reinforced by a reinforcement structure for a pipe according to still another embodiment of the present invention.

For example, as shown in FIG. 7, the reinforcement structure 20 may be configured so that a hole section 73a is formed in the end in the longitudinal direction of a pole member 73, and the plate member 21 is inserted into and secured to the hole section 73a.

In this case, it is possible to improve strength in a connection part between a pole that stands on a floor, and the floor. For this reason, it is more preferable to arrange the reinforcement structure in suitable positions in a pole member in consideration of the magnitude, the position, the direction and the like of a load that is applied to the pole member.

(D) In the foregoing first embodiment, as shown in FIG. 3, it has been illustratively described that, as the hole sections 33a and 34a that are formed on side surface parts of the rear left and right pole members 33 and 34, a hole section is formed that passes through both the side surfaces. However, the present invention is not limited to this.

For example, an opening may be formed only on one side surface to pass through the pipe to reach the interior of a pipe and not to pass through the other side surface.

(E) In the foregoing first embodiment, it has been illustratively described that the hole sections 33a and 34a are formed by using a three-dimensional laser on the pole members 33 and 34 that compose the cab 10 of the hydraulic excavator 1. However, the present invention is not limited to this.

For example, other than three-dimensional laser, the hole section may be formed by machining.

(F) In the foregoing first embodiment, as shown in FIG. 2, it has been illustratively described that a pipe to which the reinforcement structure for a pipe according to the present invention is adopted is used for the pole members 33 and 34 as C pillars that are arranged in the rear of the cab 10. However, the present invention is not limited to this.

For example, the reinforcement structure according to the present invention may be applied to a part that requires strength in the pole members 31 and 32 as an A pillar or the pole member 35 as a B pillar that compose the cab.

(G) In the foregoing first embodiment, as shown in FIG. 3, it has been illustratively described that a pipe to which the reinforcement structure for a pipe according to the present invention is adopted is used for the pole members 33 and 34 that have a substantially rectangular shape in section. However, the present invention is not limited to this.

For example, the reinforcement structure according to the present invention may be adopted to a pipe member that has a substantially circular, ellipse shape or a polygonal shape other than a rectangular shape in section.

(H) In the foregoing first embodiment, it has been illustratively described that the pole members 33 and 34 made of metal are used as pipes to which the reinforcement structure for a pipe according to the present invention is adopted. However, the present invention is not limited to this.

For example, a pipe to which the reinforcement structure according to the present invention is adopted is not limited to a metal pipe but may be applied to a resin pipe.

(I) In the foregoing first embodiment, it has been illustratively described that the pole members 33 and 34 to which the reinforcement structure for a pipe according to the present invention is adopted are used for the cab 10 of the hydraulic excavator 1. However, the present invention is not limited to this.

For example, the reinforcement structure for a pipe according to the present invention is used not only for a pole member that composes a cab of a hydraulic excavator but also for a cab that is installed on other construction machines.

(J) In the foregoing first embodiment, it has been illustratively described that the pole members 33 and 34 to which the reinforcement structure 20 for a pipe according to the present invention is adopted are used for the cab 10 of the hydraulic excavator 1. However, the present invention is not limited to this.

For example, a pipe to which the reinforcement structure according to the present invention is adopted is not limited to be used for a pole member that composes a cab of a construction machine but may be used as a pipe that is used in other applications.

(K) In the foregoing first embodiment, as shown in FIG. 5(a), FIG. 5(b) and the like, it has been illustratively described that the plate member 21 is inserted into two hole sections 33a that are formed in the rear left pole member 33 to be opposed to each other, and is secured in the state where the plate member 21 penetrates the rear left pole member 33. However, the present invention is not limited to this.

Figure 18:
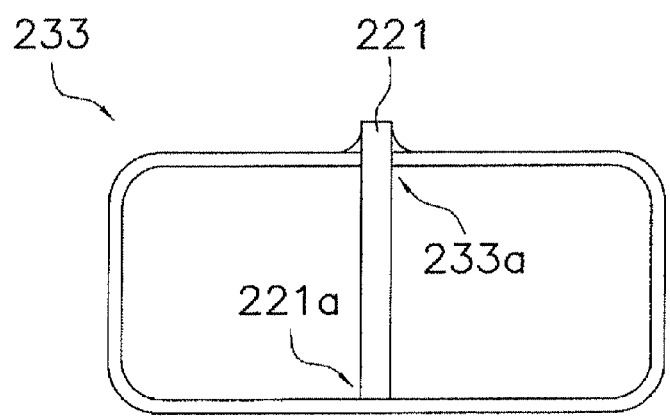
FIG. 18 is a cross-sectional view showing a reinforcement structure for a pipe according to still another embodiment of the present invention.

For example, as shown in FIG. 18, the reinforcement structure may be configured so that a plate member 221 is inserted in one hole section 233a that is formed in a rear left pole member (pole member) 233, and a insertion-side end surface 221a of the plate member 221 abuts an inner wall surface of the rear left pole member 233.

(L) In foregoing second embodiment, as shown in FIG. 15 and FIG. 16, it has been illustratively described that, as the plate member 121 that composes the reinforcement structure 120, a plate member is used that has the three protruding portions 121a that are formed on its insertion-side end surface and have the same size. However, the present invention is not limited to this.

Figure 19:
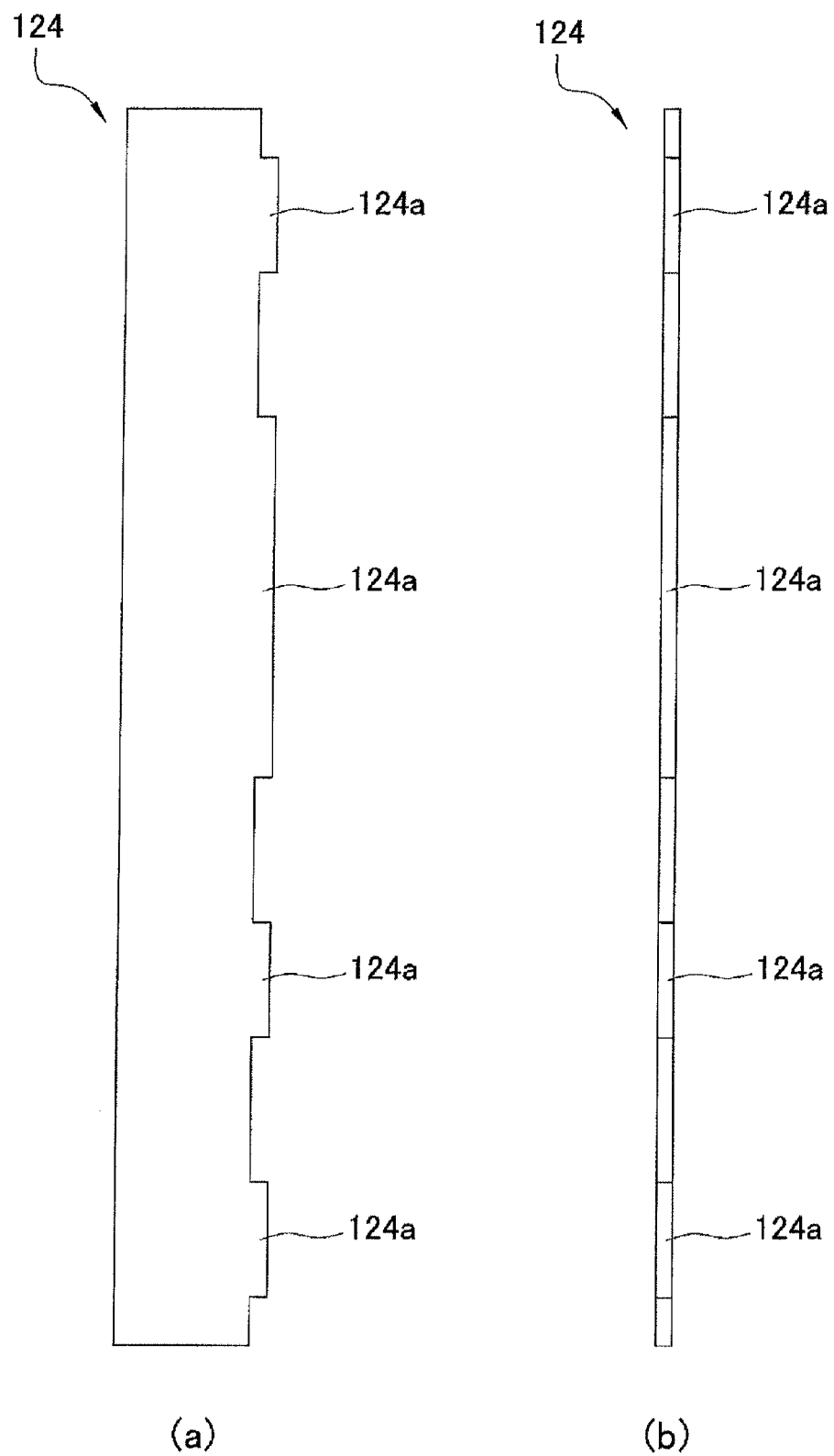
FIG. 19 includes a side view (a) and a front view (b) showing the configuration of a plate member that is used for a reinforcement structure for a pipe according to still another embodiment of the present invention.

For example, as shown in FIG. 19(a) and FIG. 19(b), a plate member 124 may be used that has protruding portions 124a with different sizes. Thus, in the case where a relatively long protruding portion is arranged or a plurality of protruding portions are arranged at a close pitch (interval) in a part that particularly requires pipe strength, in a part that is likely to subject to a stress in a pipe, or the like, it is possible to more effectively reinforce a pipe.

(M) In foregoing second embodiment, as shown in FIG. 15 and FIG. 16, it has been illustratively described that, as the plate member 121 that composes the reinforcement structure 120, a plate member is used that has the three protruding portions 121a that are formed on its insertion-side end surface to be spaced at the same interval away from each other. However, the present invention is not limited to this.

Figure 20:
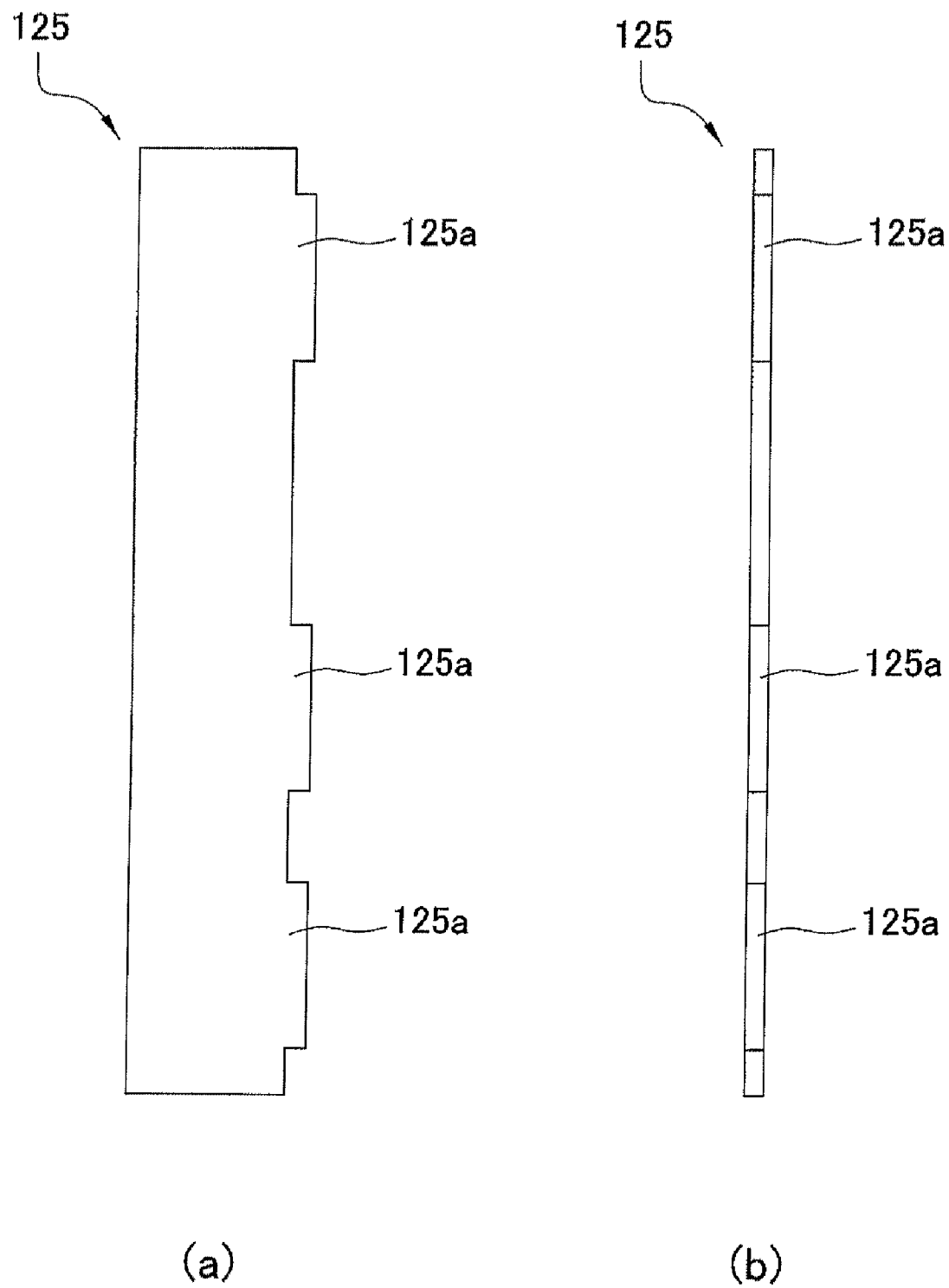
FIG. 20 includes a side view (a) and a front view (b) showing the configuration of a plate member that is used for a reinforcement structure for a pipe according to yet still another embodiment of the present invention.

For example, as shown in FIG. 20(a) and FIG. 20(b), a plate member 125 may be used that has protruding portions 125a that have the same size and are spaced at different intervals away from each other. Thus, in the case where a plurality of protruding portions are arranged at a small pitch (interval) in a part that particularly requires pipe strength, or in a part that is likely to subject to a stress in a pipe, it is also possible to more effectively reinforce a pipe.

(N) In the foregoing first and second embodiments, the plate members 21, 121 and the like have been illustratively described to be used that have a substantially rectangular flat surface. However, the present invention is not limited to this.

For example, the reinforcement structure for a pipe may be configured so that a plate member that has substantially L-shaped flat surfaces is inserted in the pole member.

EXAMPLES

For the reinforcement structure for a pipe 20 according to the foregoing embodiment that is applied to the pole members 33 and 34 that compose the cab 10 that is installed on the hydraulic excavator 1, experiment was conducted to provide how the changes of the size and the insertion position of the plate member 21 that is inserted in the hole sections 33a or the like that are formed on the outer peripheral surfaces of the pole members 33 and 34 exert influences upon the strength of the cab 10. The results will be described.

The description describes the results of EOPS test that provide the degree of deformation of the cab 10 (relationship between load and displacement amount) when a load is applied to the cab 10 that is installed on the revolving base 3 in a direction from the left surface to the working portion 4.

Figure 8:
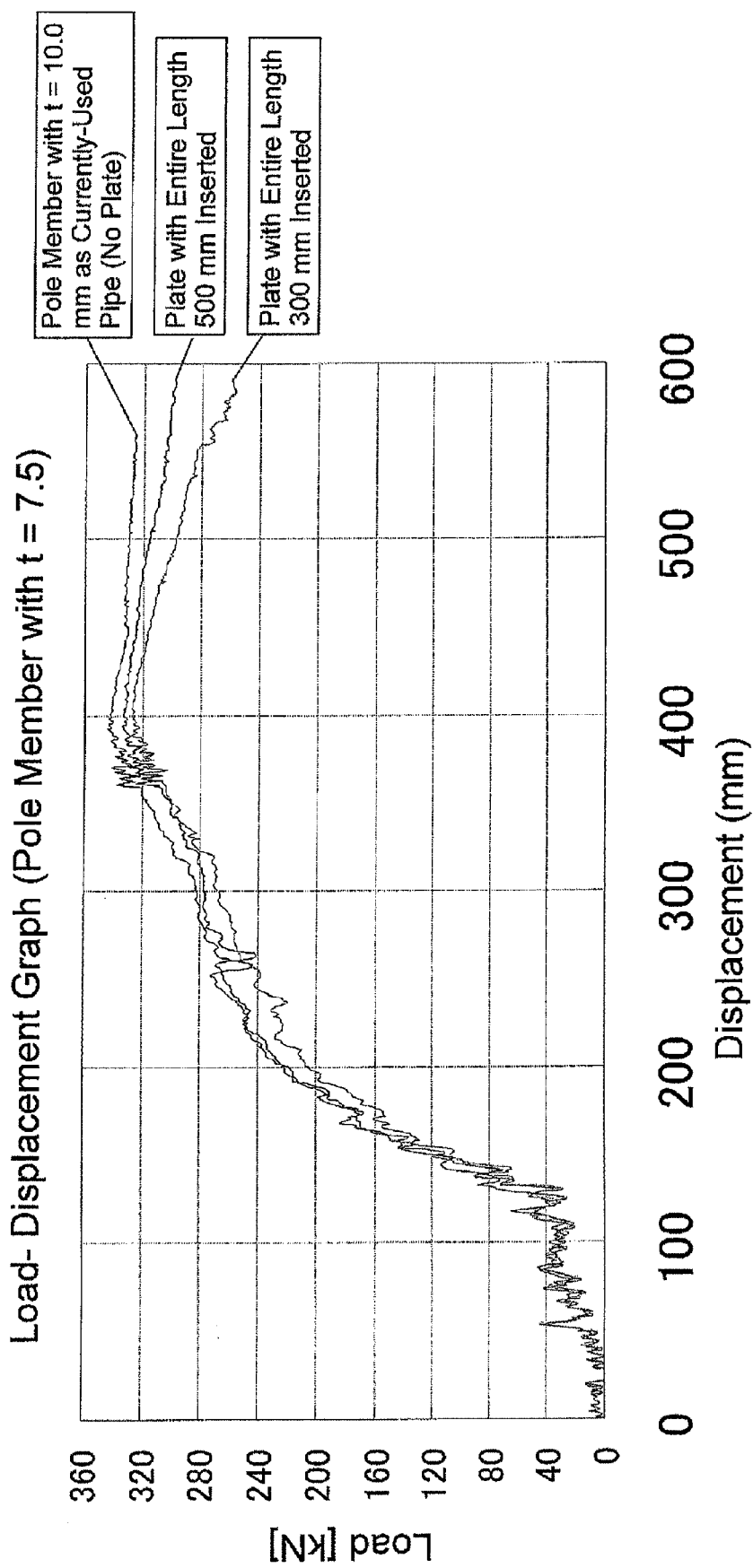
FIG. 8 is a graph showing the relationship between load and displacement in an EOPS test in conditions of different lengths of plate members that are inserted in pole members.

FIG. 8 shows a graph showing, in the case where the entire length (length in a direction perpendicularly intersects the insertion direction) of the plate member 21 is changed, the relationship between the magnitude of a load that is applied to the cab that includes the pole members, and the displacement amount of the cab. The plate member 21 is inserted in the hole sections that are formed in the pole member.

The experiment was conducted for the cabs including the plate members 21 with entire lengths of 500 mm and 300 mm. As shown in the graph of FIG. 8, it is found that the displacement amount of the plate member with entire length of 500 mm is smaller than the plate member with entire length of 300 mm, and that the plate member with entire length of 500 mm is close to a currently-used pipe with pipe thickness of 10.0 mm in strength.

Figure 9:
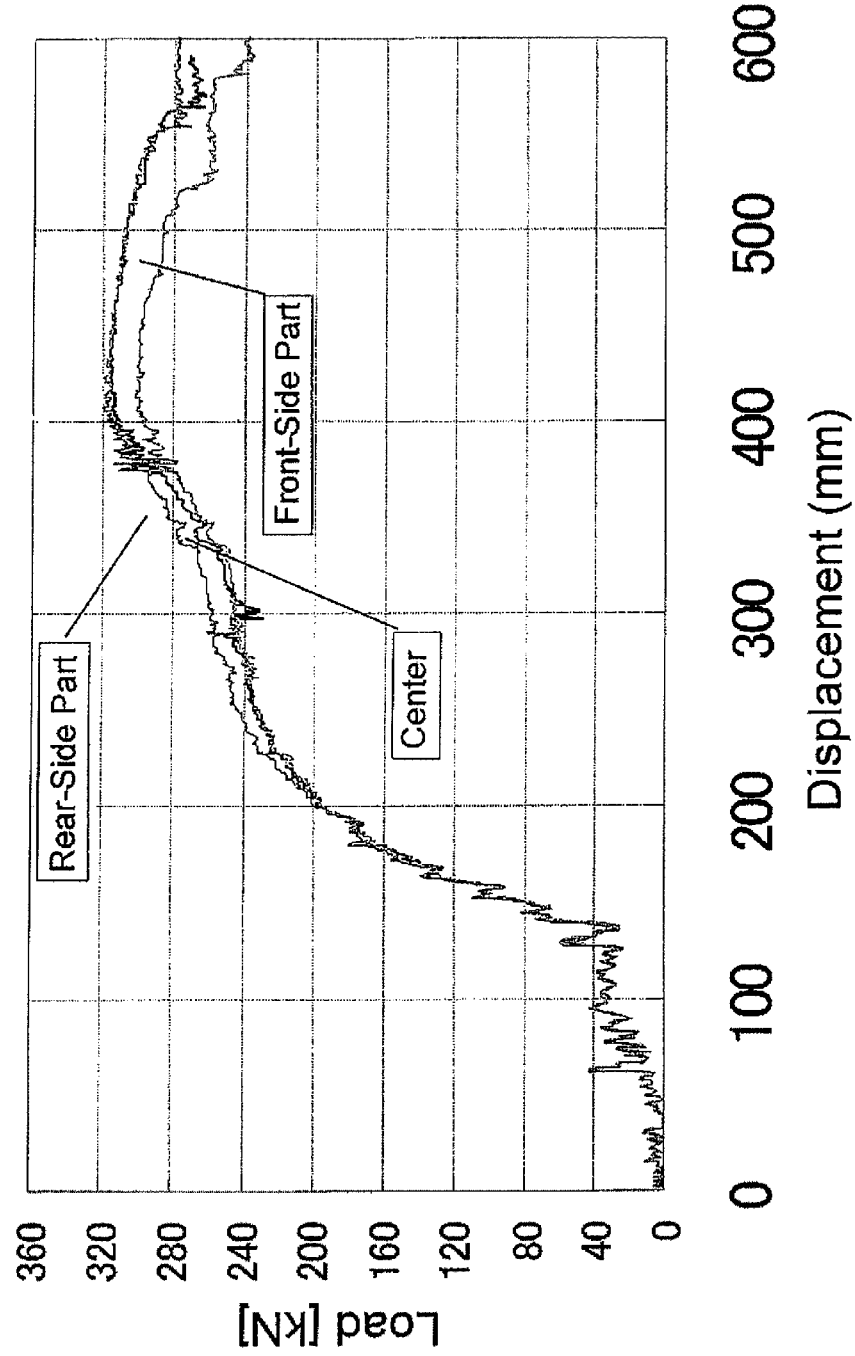
FIG. 9 is a graph showing the relationship between load and displacement in an EOPS test in conditions of different longitudinal positions of plate members that are inserted in pole members.

FIG. 9 is a graph showing, in the case where the position of the plate member is changed to the positions of the hole sections 43a and 53a (plate member 21) that are formed in the pole members 43 and 53, that is, to the front-side part and the rear-side part of the cabs 10 as shown in FIG. 6(a) and FIG. 6(b), the relationship between a load that is applied to the cab and the displacement amounts of the cab. The cab includes the pole members 33, 43 or 53.

As shown in the graph of FIG. 9, according to the results of the experiment that was conducted for the pole member 33 in that the plate member 21 was inserted in the central part, the pole member 43 in that the plate member 21 was inserted in the front-side part, and the pole member 53 in that the plate member 21 was inserted in the rear-side part, it is found that the displacement amount of the pole member 53 for the same load was the smallest in that the plate member 21 was inserted in the rear-side part, and the pole member 53 has the highest strength. Also, it is found that the displacement amount of the pole member 43 for the same load was the largest in that the plate member 21 was inserted in the front-side part, and the pole member 43 has the lowest strength.

Figure 10:
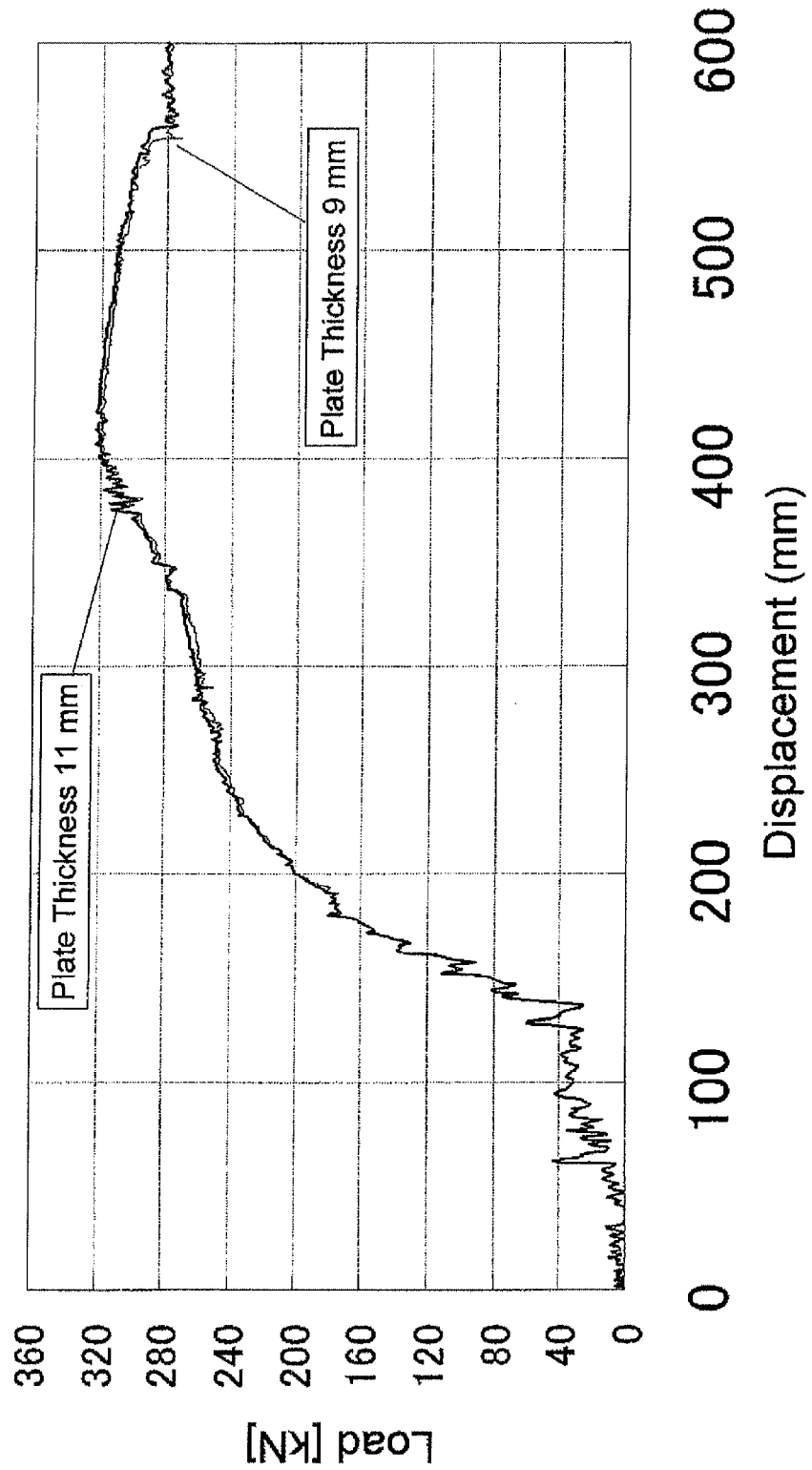
FIG. 10 is a graph showing the relationship between load and displacement in an EOPS test in conditions of different thicknesses of plate members that are inserted in pole members.

Also, FIG. 10 shows a graph showing, in the case where the thickness of the plate member 21 is changed, the relationship between the magnitude of a load that is applied to the cab that includes the pole member, and the displacement amount of the cab. The plate member 21 is inserted in the opening positions that are formed in the pole member.

As shown in the graph of FIG. 10, according to the results of the experiment that was conducted for the cabs including the plate members with thicknesses of 11 mm and 9 mm, it is found that they have a substantially similar degree of strength.

The aforementioned results show that it is preferable that the plate member to be inserted in the pole member has an entire length of approximately 500 mm and is arranged in the rear side of the cab, and has a thickness of 9 mm or more.

A reinforcement structure for a pipe according to the present invention has effects that can reduce the thickness of a pipe, and in addition to this can keep cost for reinforcement for the pipe in check and configure the reinforcement structure for a pipe by a simple configuration. Therefore, the reinforcement structure for a pipe according to the present invention can be widely applied as reinforcement structures not only for a metal pipe but also for a resin pipe.

The invention claimed is:

1. A reinforcement structure for a pipe comprising:
    a first hole section formed on an outer peripheral surface of the pipe to pass through a peripheral wall of the pipe to reach an interior portion of the pipe;
    a second hole section formed in the peripheral wall of the pipe at a position opposed to the first hole section; and
    a plate member,
    each of the first and second hole sections being an elongated slot having a length along a longitudinal direction of the pipe corresponding to a width of the plate member, and
    the plate member being inserted in the first and second hole sections and secured to the pipe.

2. A reinforcement structure for a pipe comprising:
    a first hole section formed on an outer peripheral surface of a pipe to pass through a peripheral wall of the pipe to reach an interior portion of the pipe; and
    a second hole section formed in the peripheral wall of the pipe at a position opposed to the first hole section; and
    a plate member having a protruding portion,
    the first hole section being a slot that has a length corresponding to a maximum width of the plate member, and
    the second hole section being a slot that has a length corresponding to a width of the protruding portion of the plate member,
    the plate member being inserted in the first and second hole sections so that the protruding portion of the plate member is inserted in the second hole section, and the plate member being secured to the pipe.

3. The reinforcement structure for a pipe according to claim 1, further comprising
    an additional hole section formed on the outer peripheral surface of the pipe to pass through the peripheral wall of the pipe to reach the interior portion of the pipe, and
    an additional plate member inserted into the additional hole section and secured to the pipe.

4. The reinforcement structure for a pipe according to claim 1, wherein
    the plate member has a protruding portion that protrudes in a direction that intersects an insertion direction in which the plate member is inserted into the pipe, the protruding portion abutting against the outer peripheral surface of the pipe.

5. The reinforcement structure for a pipe according to claim 1, wherein
    the plate member is secured to the pipe by welding.

6. The reinforcement structure for a pipe according to claim 2, wherein
the plate member has a plurality of protruding portions on an insertion-side end portion of the plate member.

7. The reinforcement structure for a pipe according to claim 1, further comprising
an additional plate member inserted and secured to the pipe.

8. The reinforcement structure for a pipe according to claim 1, wherein
the plate member is welded along side surfaces of a protruding portion of the plate member that sticks out from the outer peripheral surface of the pipe.

9. The reinforcement structure for a pipe according to claim 1, wherein
the first and second hole sections are formed in proximity to the center of the pipe in the longitudinal direction.

10. The reinforcement structure for a pipe according to claim 1, wherein
the first and second hole sections are formed at an end part of the pipe in the longitudinal direction.

11. The reinforcement structure for a pipe according to claim 6, wherein
the protruding portions are spaced at different intervals away from each other.

12. The reinforcement structure for a pipe according to claim 6, wherein
the protruding portions have different lengths.

13. A cab structure for a construction machine comprising:
a pair of pipe-shaped pole members disposed at left and right rear corners of the cab structure, respectively, each of the pipe-shaped pole members including
a first hole section formed on an outer peripheral surface of the pipe-shaped pole member to pass through a peripheral wall to reach an interior portion of the pipe-shaped pole member,
a second hole section formed in the peripheral wall of the pipe-shaped pole member at a position opposed to the first hole section; and
a pair of plate members, each of the plate members being inserted in the first and second hole sections of a corresponding one of the pipe-shaped pole members from a lateral side of the cab structure and secured to the pipe-shaped pole members.

14. The cab structure for a construction machine according to claim 13, further comprising
a cover member that covers a part of each of the pipe-shaped pole member where the plate members is inserted in the first and second hole sections.

* * * * *